US008782014B2

(12) United States Patent
Shepard et al.

(10) Patent No.: US 8,782,014 B2
(45) Date of Patent: Jul. 15, 2014

(54) DATA INTEGRITY MECHANISM FOR EXTERNAL STORAGE DEVICES

(75) Inventors: William C. Shepard, Hyde Park, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 12/780,662

(22) Filed: May 14, 2010

(65) Prior Publication Data

US 2011/0282846 A1    Nov. 17, 2011

(51) Int. Cl.
    *G06F 17/30*    (2006.01)
(52) U.S. Cl.
    USPC .......................................... 707/687; 707/821
(58) Field of Classification Search
    USPC .................... 707/687, E17.007, 821
    See application file for complete search history.

(56) References Cited

U.S. PATENT DOCUMENTS

| | | | |
|---|---|---|---|
| 7,188,230 B2 | 3/2007 | Osaki | |
| 7,308,450 B2 | 12/2007 | Saika | |
| 7,493,656 B2 | 2/2009 | Goodwill et al. | |
| 2002/0095602 A1* | 7/2002 | Pherson et al. | 713/201 |
| 2002/0138691 A1* | 9/2002 | Yamamoto et al. | 711/112 |
| 2003/0065782 A1* | 4/2003 | Nishanov et al. | 709/226 |
| 2003/0217158 A1* | 11/2003 | Datta | 709/228 |
| 2004/0128548 A1* | 7/2004 | Basha et al. | 713/201 |
| 2005/0182769 A1* | 8/2005 | Fujita et al. | 707/10 |
| 2009/0150638 A1* | 6/2009 | Kawasaki | 711/170 |

* cited by examiner

*Primary Examiner* — Shiow-Jy Fan
(74) *Attorney, Agent, or Firm* — Cantor Colburn LLP; William A Kinnaman, Jr.

(57) ABSTRACT

A method for maintaining data integrity of a storage device is provided. A request is received to create an access monitoring session for a data range on a volume of the storage device. A session identification (ID) is determined for the access monitoring session for data range on the volume. An entry is created in an access monitoring session table for the session ID, and the entry adds the access monitoring session with session ID for the data range on the volume to the access monitoring session table. Request parameters are included in the request to create the access monitoring session. The request parameters denote access to the data range on the volume for the session ID and are stored in the access monitoring session table. Access is controlled to the data range on the volume for the session ID based on request parameters stored in the access monitoring session table.

23 Claims, 30 Drawing Sheets

HOST OS ACCESS MONITORING SESSION TABLE 104    Volume/Range list address

| Session ID | Control unit ID | Notify exit address | Scope | This host Type\|Actions | | All other hosts Type\|Actions | | Ownership type | Owner | V/R |
|---|---|---|---|---|---|---|---|---|---|---|
| CUWWNN5-0001 | 5000 | 36FFA018 | host | none | n/a | write | prevent | single with alternates | yes | • |
| CUWWNN3-0012 | 3000 | 7F002128 | host | none | n/a | write | notify | single | yes | • |
| CUWWNN5-0007 | 5000 | 7B220020 | host | none | n/a | all | notify | single | yes | • |
| CUWWNN5-0002 | 5000 | 022D3300 | request | all | prevent | all | prevent | all joined | yes | • |

| 5010 | 02500 / 03200 |
|---|---|

Volume/ Range: from start address to end address 221a

| 3124 | 00500 / 00650 | 01800 / 02000 |
|---|---|---|
| 3513 | 18008 / 18520 | - |

221b

| 5053 | 02100 / 02200 |
|---|---|

221c

| 5906 | 01100 / 01900 |
|---|---|

221d

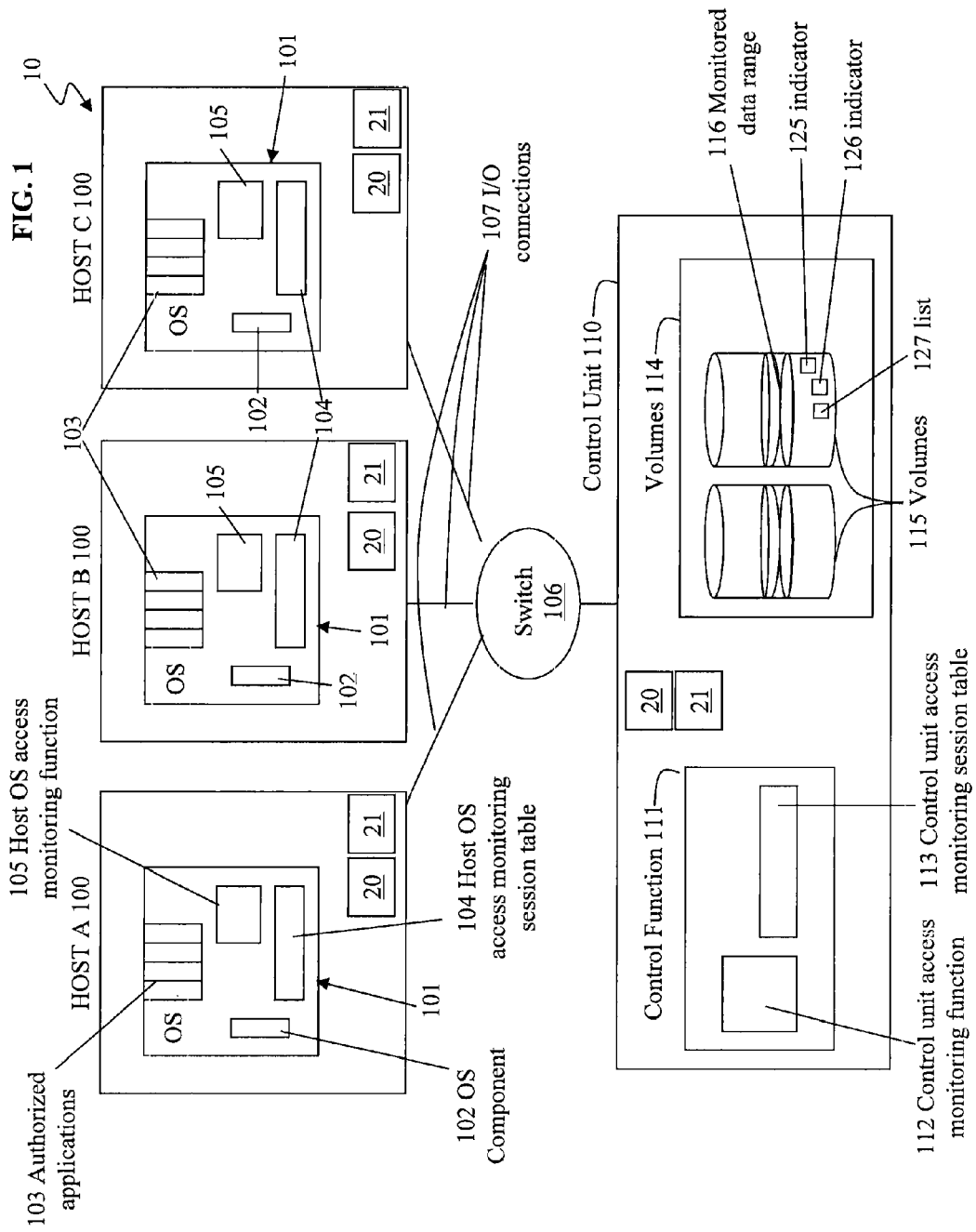

FIG. 2A

| HOST OS AND CONTROL UNIT ACCESS MONITORING REQUESTS 200 |
|---|
| 1. Create an access monitoring session |
| 2. Join an access monitoring session |
| 3. Leave an access monitoring session |
| 4. Remove an access monitoring session |
| 5. Become an owner of an access monitoring session |
| 6. Query access monitoring session info |

FIG. 2B

PARAMETERS FOR A HOST OS AND/OR CONTROL UNIT ACCESS
MONITORING REQUEST 201

- Function (See Requests 200 in FIG. 2A)
- Session ID
- Control unit ID (host OS only)
- Notify exit address (host OS only)
- Query type – single session or all sessions
- Scope – host or request
- Type for this host – none, write or all
- Type for all other hosts – none, write or all
- Actions for this host – prevent or notify
- Actions for all other hosts – prevent or notify
- Ownership type - single, single with alternates, all joined, or all attached
- Owner – yes, no, or alternate
- Volume/range list
  - Length, number of volumes
  - 1st volume ID, number of ranges
    - 1st range start address, end address
    - ...
    - Last range start address, end address
  - o...
  - Last volume ID, number of ranges
    - 1st range start address, end address
    - ...
    - Last range start address, end address

CONTROL UNIT ACCESS MONITORING SESSION TABLE 113

| Session ID | Scope | Owner-ship type | Host 1 (e.g., Host A) Type\|Actions\|Owner | | | Host 2 (e.g., Host B) Type\|Actions\|Owner | | | Host n (e.g., Host C) Type\|Actions\|Owner | | | V/R |
|---|---|---|---|---|---|---|---|---|---|---|---|---|
| CUWWN N5-0001 | host | single with alternates | none | n/a | owner | none | n/a | alternate | write | prevent | no | |
| CUWWN N5-0015 | host | single | write | prevent | no | none | n/a | owner | write | prevent | no | •|
| CUWWN N5-0007 | host | single | none | n/a | owner | write | notify | joined | all | notify | no | •|
| CUWWN N5-0002 | request | all joined | all | prevent | owner | all | prevent | owner | all | prevent | no | •|

Volume/Range list address

Volume/Range: from start 226a address to end address

| 5010 | 02500 / 03200 |
|---|---|

| 5002 | 10020 / 10130 | 16040 / 16450 |
|---|---|---|
| 5018 | 18008 / 18520 | 20340 / 20850 |

226b

| 5053 | 02100 / 02200 |
|---|---|

226c

| 5906 | 01100 / 01900 |
|---|---|

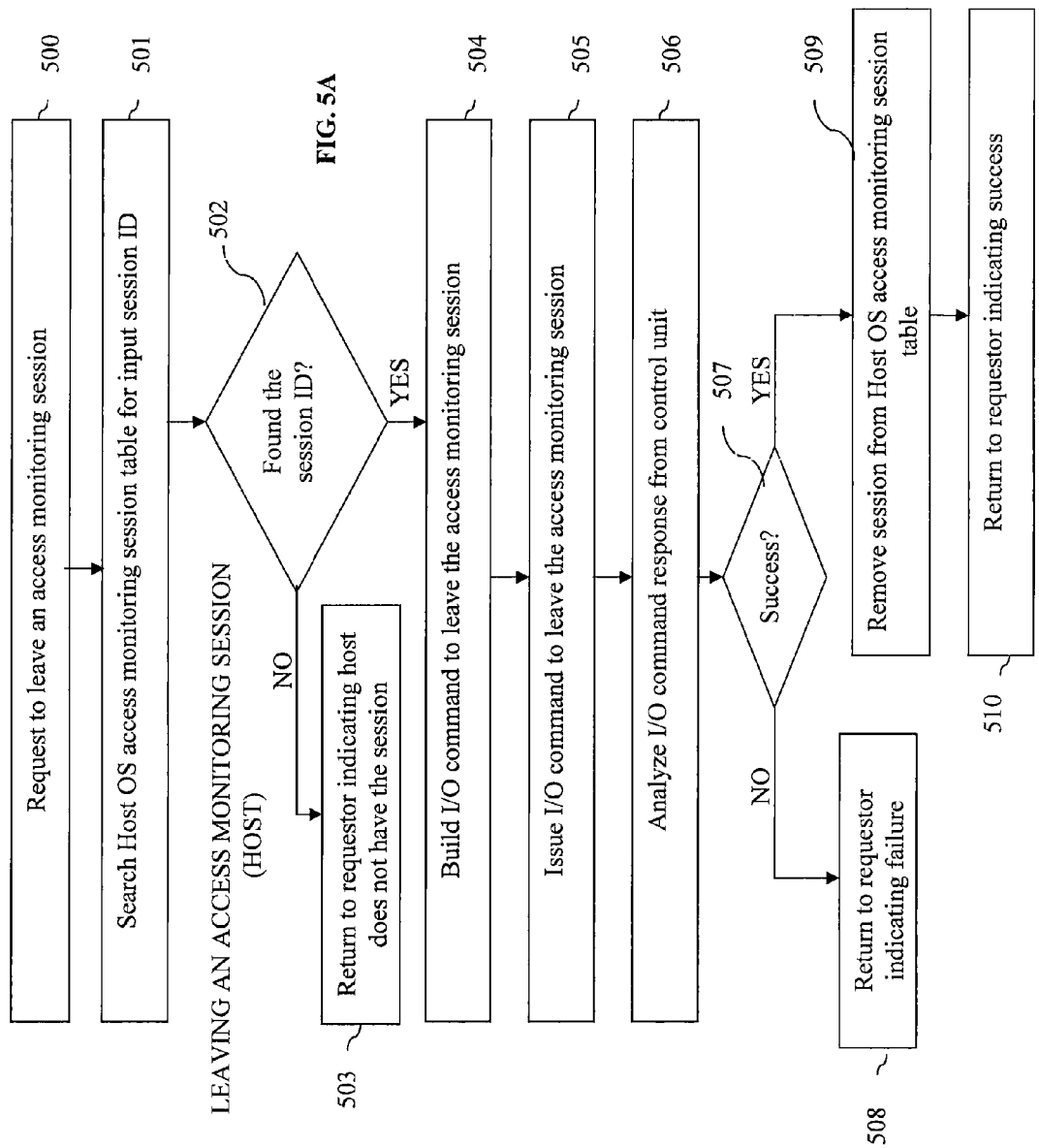

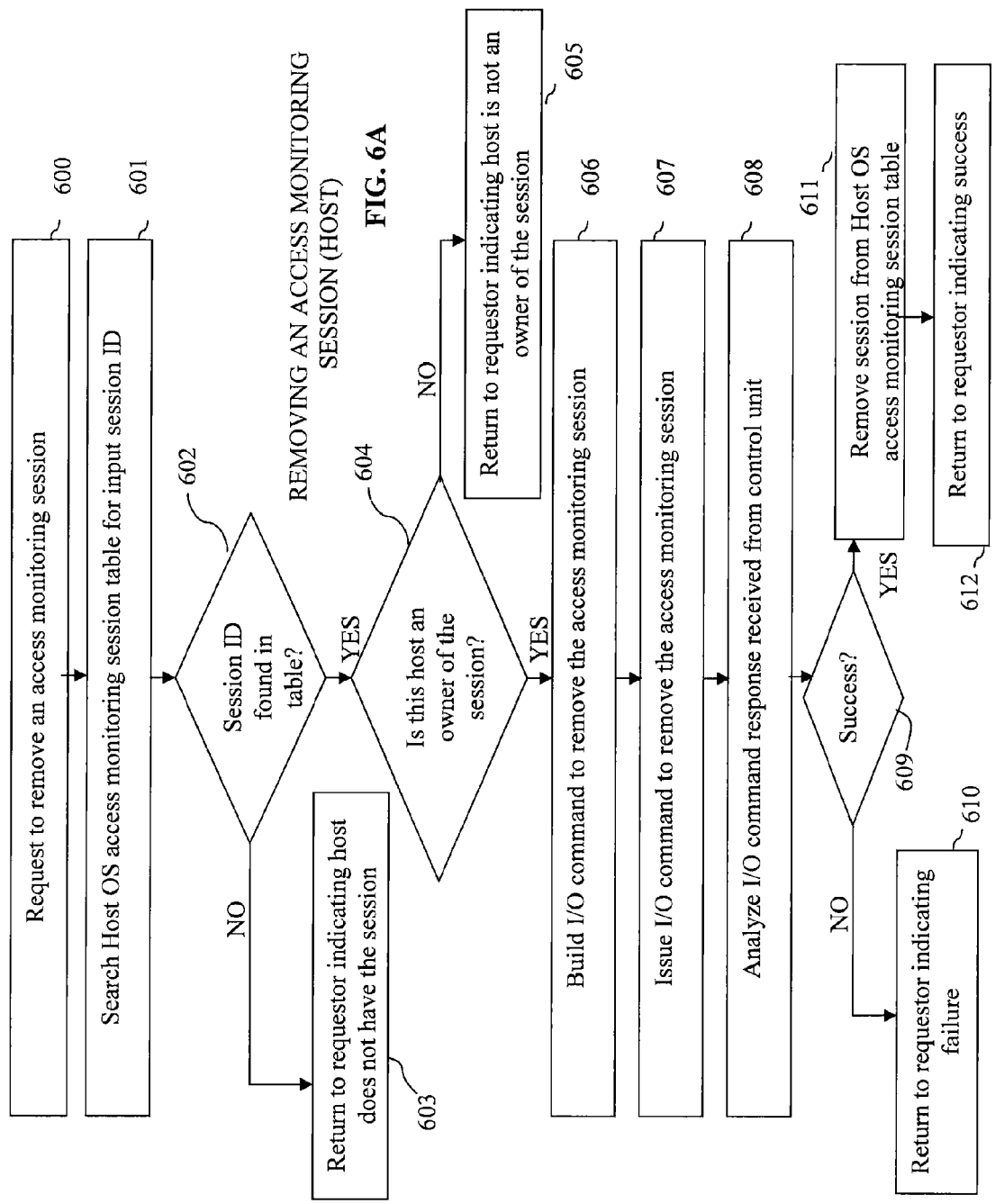

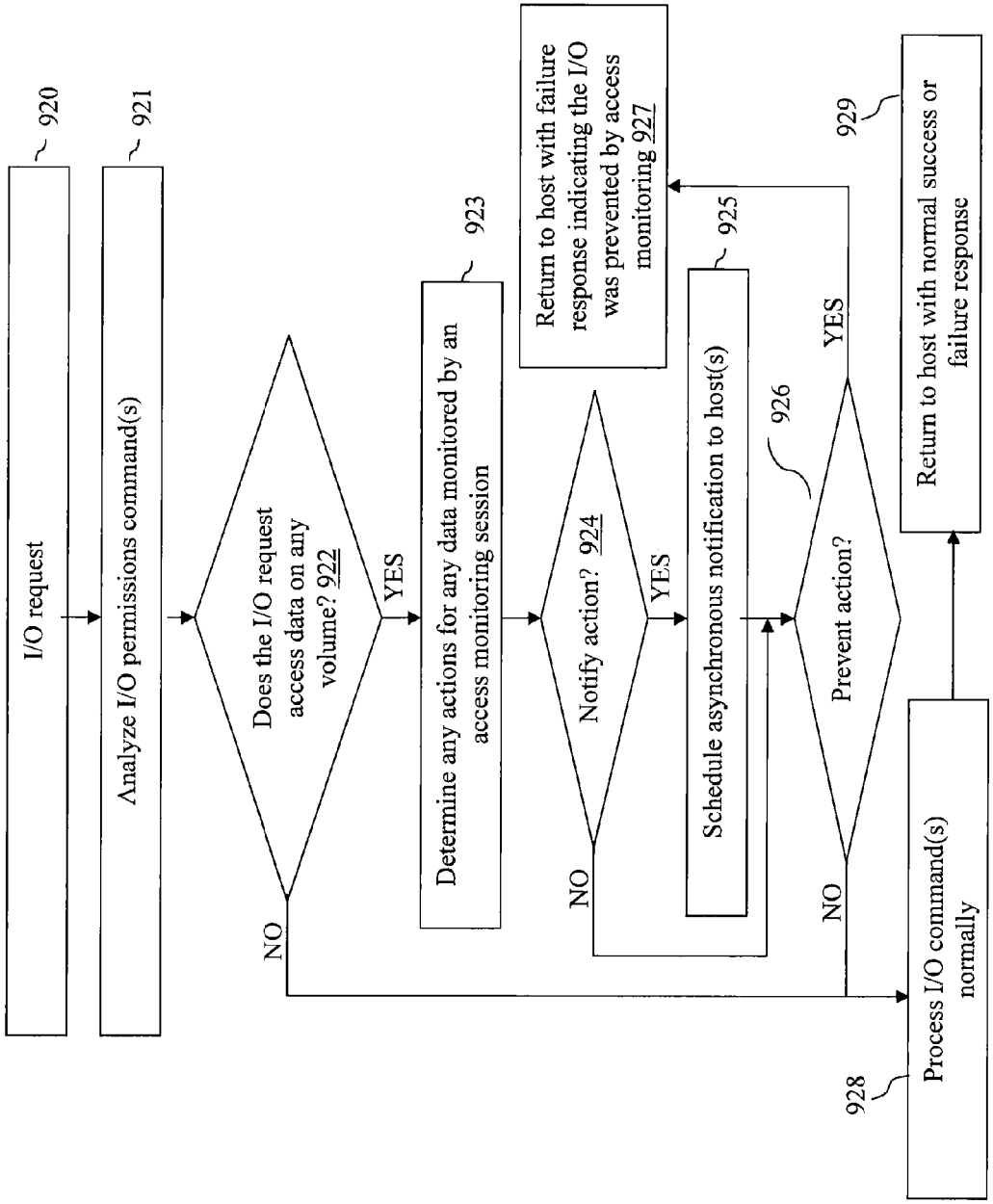

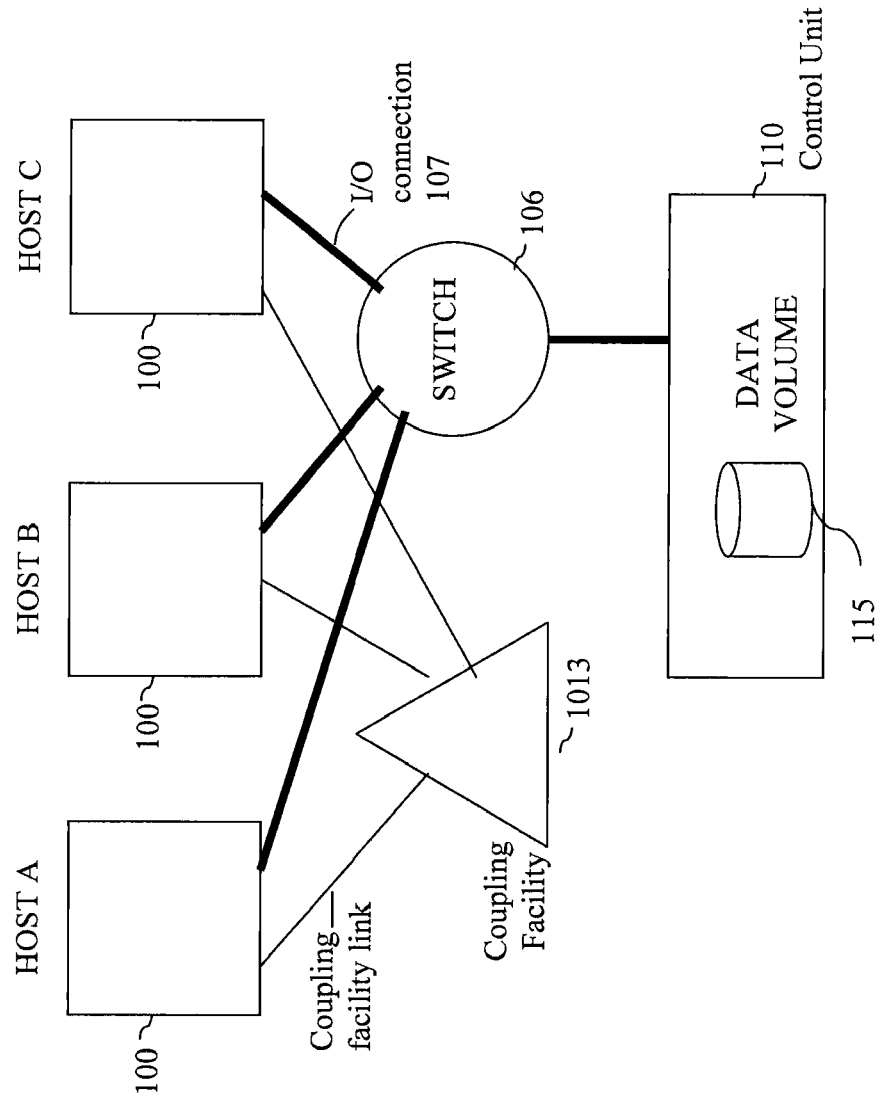

COORDINATING AN ACCESS MONITORING SESSION WITH MULTIPLE HOST SYSTEMS
SETTING UP A MONITORING SESSION

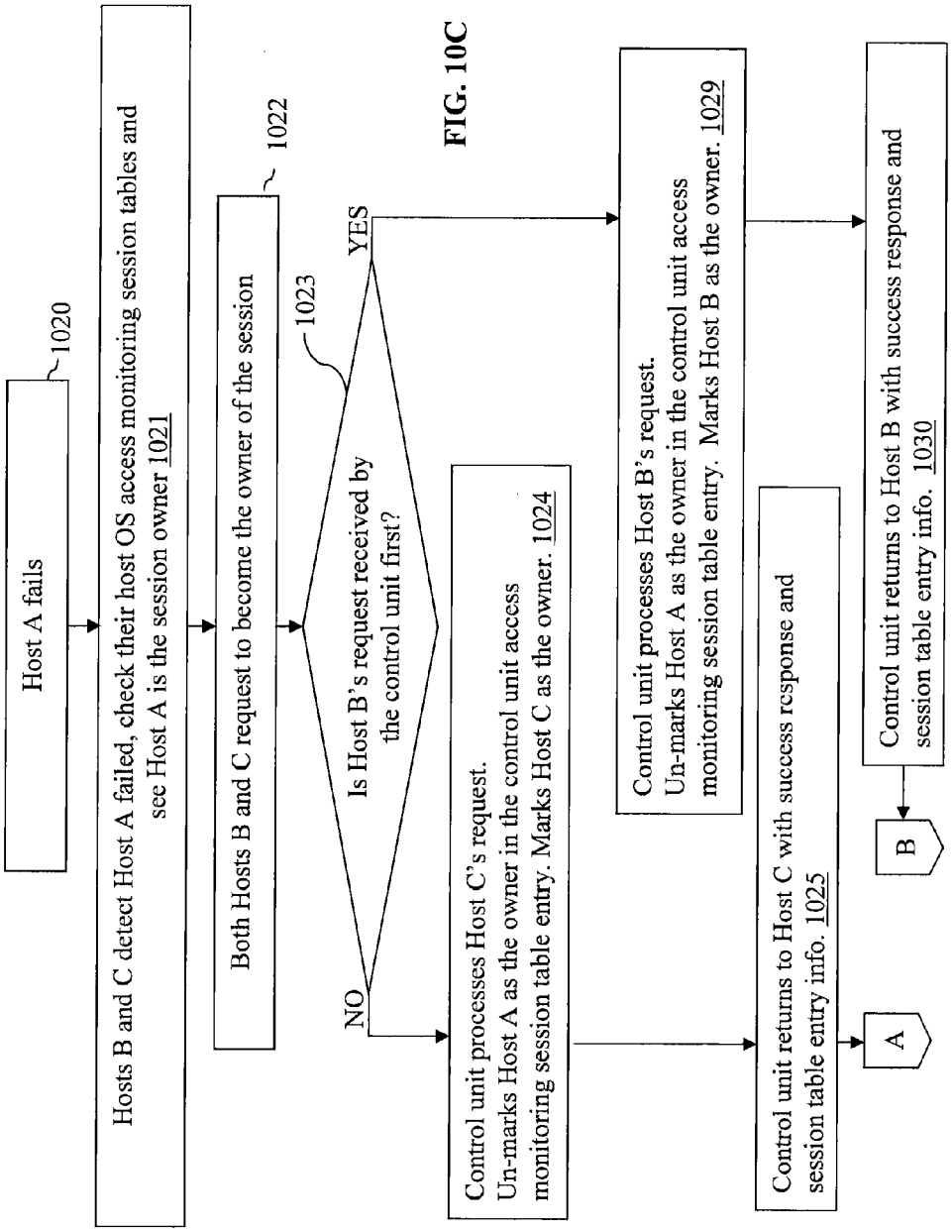

COORDINATING AN ACCESS MONITORING SESSION WITH MULTIPLE HOST SYSTEMS TAKEOVER OF AN ACCESS MONITORING SESSION WHEN THE OWNING HOST FAILS

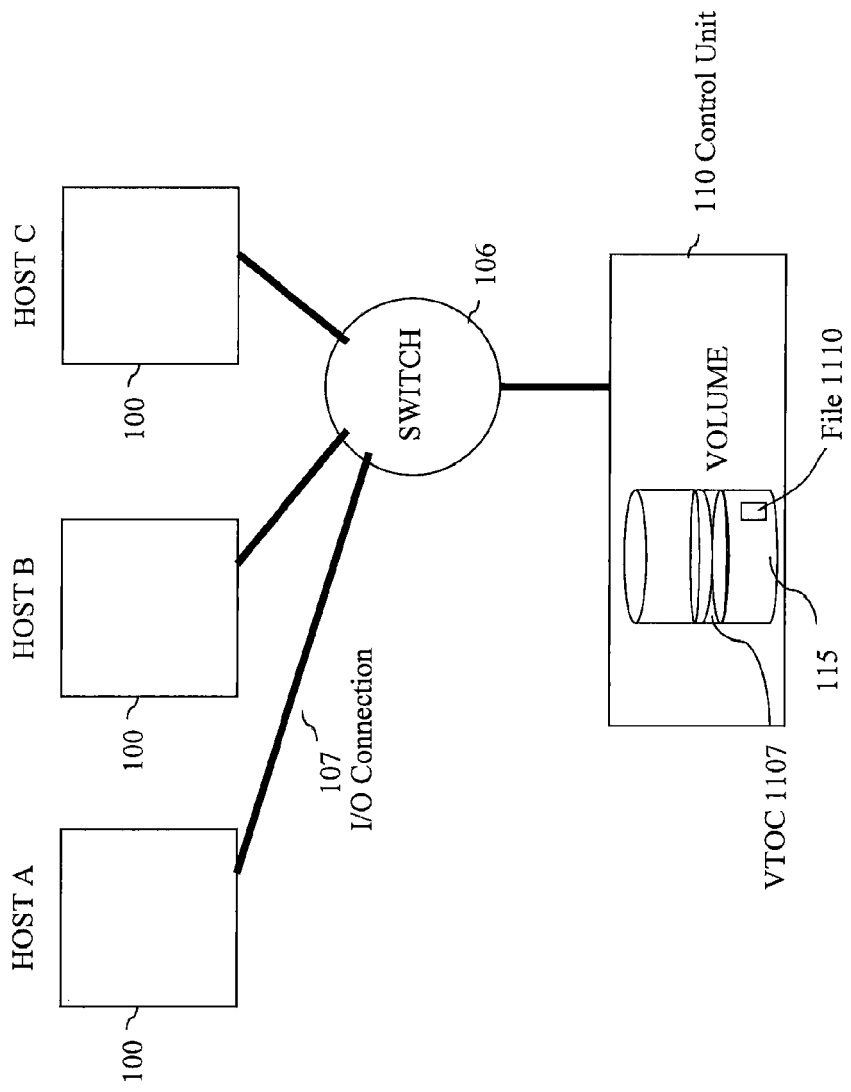

PROTECTING A VTOC USING AN ACCESS MONITORING SESSION SHARED WITH MULTIPLE HOST SYSTEMS (SETTING UP THE MONITORING SESSION)

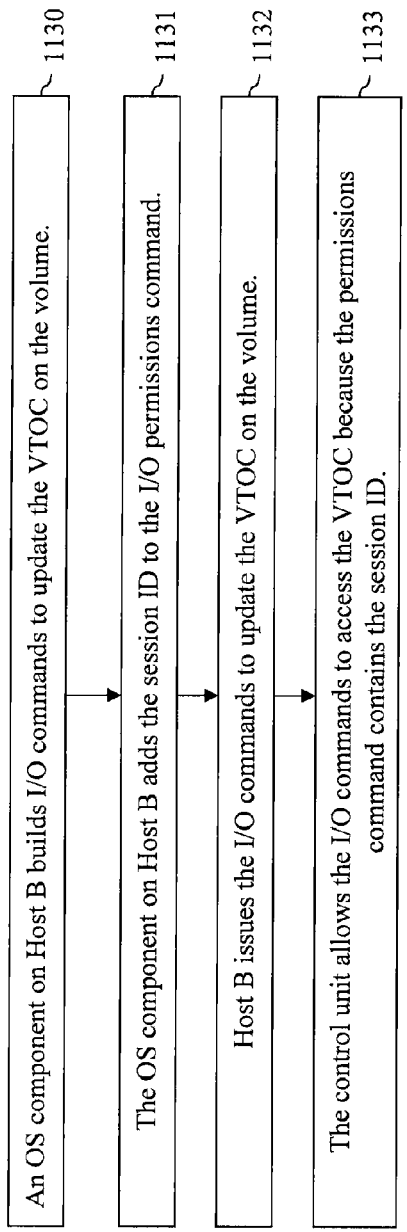
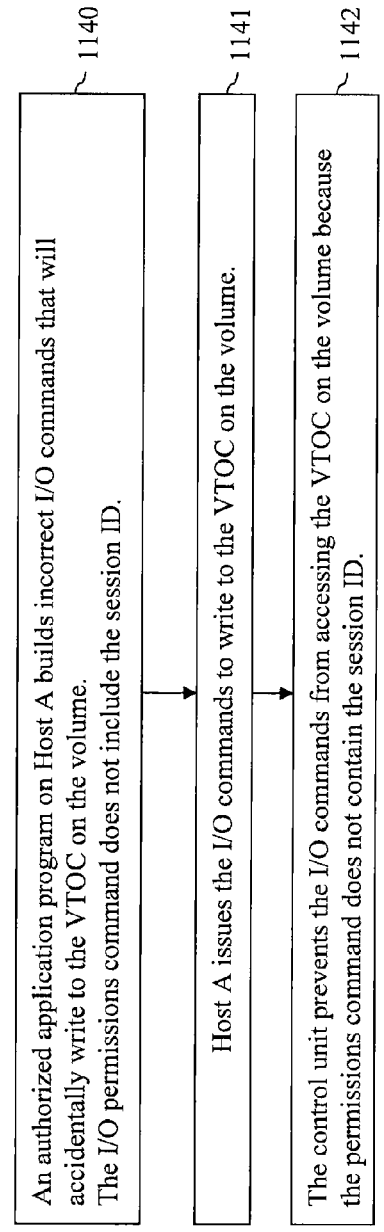

US 8,782,014 B2

DATA INTEGRITY MECHANISM FOR EXTERNAL STORAGE DEVICES

BACKGROUND

Exemplary embodiments of the present invention relate to storage, and more specifically, to data integrity of external storage devices.

External storage (also referred to as a secondary storage device) is any device that temporarily stores information and external storage is generally not permanently fixed inside a computer. A direct access storage device, or DASD, is any secondary storage device which has relatively low access time for all its capacity. The DASD is accessed by a computer system. Historically, IBM® introduced the term to cover three different device types: disk drives, magnetic drums, and data cells. Modern DASD most commonly means but is not limited to large disk arrays utilizing, e.g., RAID (Redundant Array of Independent Disks) schemes. A disk array is a disk storage system which contains multiple disk drives. It is differentiated from a disk enclosure, in that an array has cache memory and advanced functionality, like RAID and virtualization. Components of a typical disk array include disk array controllers, cache memories, disk enclosures, power supplies, etc. Typically a disk array provides increased availability, resiliency and maintainability by using additional, redundant components (controllers, power supplies, fans, etc.), often up to the point when all single points of failure (SPOFs) are eliminated from the design. Typically, disk arrays are divided into categories: network attached storage (NAS) arrays, storage area network (SAN) arrays, and/or storage virtualization as understood by one skilled in the art.

In a computer system with one or more host systems (computers) connected to one or more external storage systems, loss of data integrity for data on external storage devices can occur if the wrong data (data residing at the wrong external storage location) is accidentally updated ("clobbered"). Similarly, loss of data integrity can occur if the correct data is updated at the wrong time.

SUMMARY

According to one exemplary embodiment, a method for maintaining data integrity of a storage device is provided. A request is received to create an access monitoring session for a data range on a volume of the storage device. A session identification (ID) is determined for the access monitoring session for the data range on the volume. An entry is created in an access monitoring session table for the session ID, in which the entry adds the access monitoring session with the session ID for the data range on the volume to the access monitoring session table. Request parameters are included in the request to create the access monitoring session. The request parameters denote access to the data range on the volume for the session ID and the request parameters are stored in the access monitoring session table. Access is controlled to the data range on the volume for the session ID based on the request parameters stored in the access monitoring session table.

Additional features are realized through the techniques of exemplary embodiments. Other embodiments are described in detail herein and are considered a part of the claimed invention. For a better understanding of features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features are apparent from the following detailed description taken in conjunction with the accompanying drawings in which:

FIG. 1 illustrates a block diagram for data integrity mechanisms for external storage controllers that control external storages in accordance with exemplary embodiments.

FIG. 2A illustrates monitoring requests in accordance with exemplary embodiments.

FIG. 2B illustrates parameters for monitoring requests in accordance with exemplary embodiments.

FIGS. 2C and 2D illustrate examples of access monitoring session tables in accordance with exemplary embodiments.

FIGS. 4A, 4B, 5A, 5B, 6A, 6B, 7A, 7B, 8A, 8B are flow charts illustrating various requests in accordance with exemplary embodiments.

FIGS. 9A and 9B are flow charts illustrating host input/output (I/O) requests in accordance with exemplary embodiments.

FIGS. 10A, 10B, and 10C illustrate examples of coordination with multiple host systems in accordance with exemplary embodiments.

FIGS. 11A, 11B, 11C, and 11D illustrate examples of protecting content in accordance with exemplary embodiments.

DETAILED DESCRIPTION

Figure 2C:
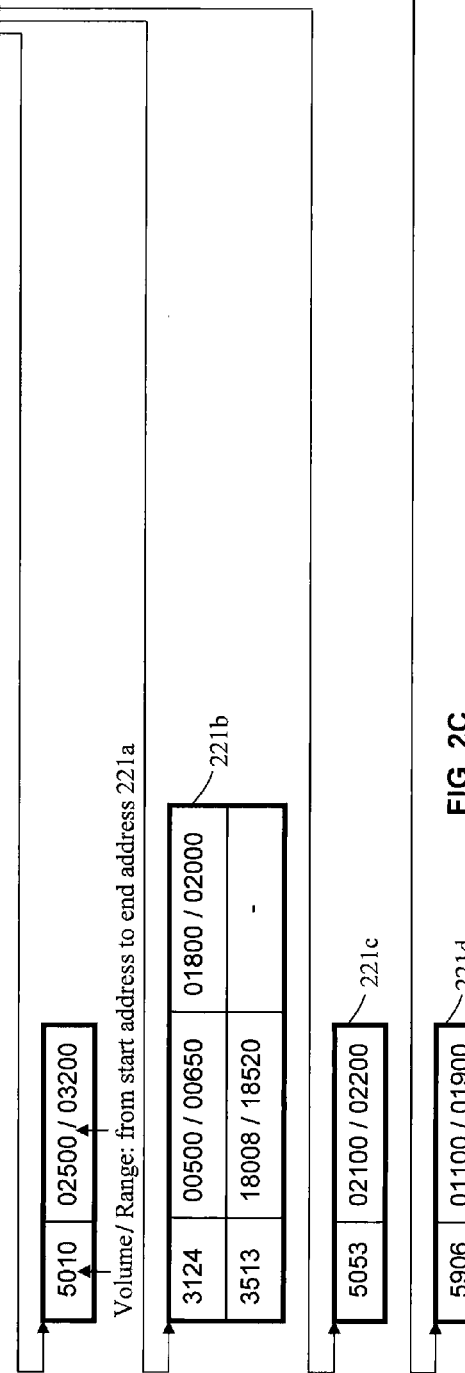

Exemplary embodiments are configured to detect accidental updates and/or reads to certain external storage locations in order to prevent such updates and/or reads, and/or to notify the host system(s) of such updates so that they can take recovery actions. Accordingly, exemplary embodiments provide a mechanism for protecting data residing on external storage devices from accidental corruption and/or access by one or more host systems.

Some examples of where the capability of exemplary embodiments may be utilized are: the contents of several DASD volumes, each of which is accessed by a separate application, are moved to one very large DASD volume, and it is desirable to maintain separate access; for data isolation, where only a subset of the attached hosts are allowed to use a set of files on one or more volumes; a DASD volume that has system control information for the volume (e.g., volume table of contents (VTOC)), which should only be updated by certain host operating system programs and only by one such program at a time; a file (data) on external storage that contains a record with control information for that file, which should not be updated by most host programs that use the file; a DASD volume that contains a database that is updated by one host system and only queried (read) by another host system; and/or a DASD volume that contains a volume label, which should rarely be updated (e.g., an unexpected update (write) could indicate a data integrity problem, and the attached host system(s) should be notified).

DASD volumes (external storage devices) are used for storing data and executable programs (including the operating system itself), and for temporary working storage. DASD labels identify DASD volumes and the data sets they contain. One DASD volume can be used for many different data sets, and space on it can be reallocated and reused. On a volume, the name of a data set must be unique. A data set can be located by device type, volume serial number, and data set name. Although DASD volumes differ in physical appearance, capacity, and speed, they are similar in data recording, data checking, data format, and programming. The recording surface of each volume may be divided into many concentric tracks. The number of tracks and their capacity vary with the DASD. Each DASD has an access mechanism that contains read/write heads to transfer data as the recording surface rotates past them. The operating system uses groups of labels to identify DASD volumes and the data sets they contain. Customer application programs generally do not use these labels directly, and DASD volumes can utilize standard labels. Standard labels include a volume label, a data set label for each data set, and optional user labels. A volume label, stored at track 0 of cylinder 0, identifies each DASD volume. The z/OS® system programmer or storage administrator may use the ICKDSF (IBM® Device Support Facility) utility program to initialize each DASD volume before it is used on the system. ICKDSF generates the volume label and builds the volume table of contents (VTOC), which is a structure that contains the data set labels. The system programmer can also use ICKDSF to scan a volume to ensure that it is usable and to reformat all the tracks. Note that although examples may be provided using DASD for explanation purposes, exemplary embodiments equally apply to other platforms, such as UNIX.

Exemplary embodiments are configured to provide features for one or more host systems (such as host systems A, B, and/or C) to instruct an external storage controller (also known as a control unit (CU)) to monitor portions of data on one or more storage volumes (e.g., on a DASD) in order to detect access and/or to control access to the storage volume(s). This is done by a host system communicating the contiguous range(s) of data blocks on storage volume(s) to be monitored to the control unit using a new (or modified) I/O command. The I/O command sends parameters to the control unit to indicate the storage volume(s) and the data block range(s) and information about how the data is to be monitored. The control unit maintains a table of monitoring sessions listing for each session, the monitoring session token (assigned by the control unit), the storage volume(s) identification (name) and data block range(s), and information about how the data is to be monitored. When the control unit processes an I/O request that will attempt to access a data block range on a storage volume, the control unit will determine if there is a monitoring session in the table for that data block range. If the data block range is being monitored, then depending on whether the I/O request is attempting read or write access and depending on the type of monitoring being done, the control unit may allow the access, allow the access but notify the host system(s), and/or prevent the access.

As such, exemplary embodiments allow host system software to instruct an external storage controller to monitor certain data on the external storage (e.g., DASD) for the purpose of detecting and/or preventing access. Also, exemplary embodiments allow host system software to enhance data integrity by providing a firm mechanism for a control unit to detect and/or prevent erroneous updates and/or reads to data on external storage volumes. Exemplary embodiments provide the flexibility to monitor any data on any storage volume, to establish multiple monitoring sessions to monitor multiple sets of data, and to support multiple host systems.

Now turning to FIG. 1, FIG. 1 illustrates a block diagram 10 for data integrity mechanisms for external storage controllers that control external storages in accordance with exemplary embodiments. The block diagram 10 depicts a computing system comprising several host systems 100 (e.g., host system A, host system B, and host system C) with I/O attachments (I/O connections) 107 to an external storage controller also known as a control unit 110 through an optional switch 106, and the attached host systems 100 include host system A, host system B, and host system C. Each attached host system 100 contains an operating system image (OS) 101, which includes authorized application programs 103, operating system components (one shown for simplicity) 102, a Host OS access monitoring function 105, and a Host OS access monitoring session table 104.

The control unit 110 contains (or is coupled to) a control function 111 that performs I/O (input/output) operations with the attached hosts 100 and volumes 114 containing host data. The control function 111 includes a control unit access monitoring function 112 and a control unit access monitoring session table 113. The control unit 110 with the storage volumes 114 may be considered as, e.g., a DASD. Also, the control unit 110 may be separate from the storage volumes 114 and the storage volumes 114 may be considered the DASD. The control unit 110 may control additional volumes 114 (not shown for simplicity). The volumes 114 may comprise individual volumes 115, and each individual volume 115 may be known to the control unit 110 by a unique volume ID (name). The host systems 100 can use a different kind of volume ID than that used by the control unit 110. For example, in the IBM zSeries® system, the host systems 100 identify a volume by a "device number", and the control unit 110 identifies a volume 115 by the control unit image and unit address. A volume 115 can have one or more data ranges (which are a set of contiguous data blocks 116) being monitored for accidental corruption. In FIG. 1, an example monitored data range 116 (which may represent numerous monitored data ranges 116) is shown in the volume 115. Although multiple monitored data ranges 116 and multiple control units 110 may be utilized in exemplary embodiments, only one is shown so as not to obscure FIG. 1.

The storage control unit 110 comprises all the hardware and software components to operate and function as a control unit as understood by one skilled in the art. Likewise, the storage volumes 114 comprises all the hardware and software components to operate and function as storage volumes as understood by one skilled in the art. For example, the hosts 100 and the control unit 110 include one or more processors 20 and memory 21 along with other functionality understood by one skilled in the art.

Monitoring by the control unit access monitoring function 112 for accidental corruption of volumes 114 is done using "access monitoring sessions", and each access monitoring session describes the instructions from one or more host systems 100 to the control unit 110 for monitoring a set of data (such as the monitored data range 116) on one or more volumes 115 in the control unit 110. One control unit 110 can have multiple access monitoring sessions in effect at once via the control unit access monitoring function 112. In this exemplary embodiment, one access monitoring session (by the control unit access monitoring function 112) can monitor data on a single control unit 110; however, it is also possible for one access monitoring session (by the control unit access monitoring function 112) to monitor data on multiple control units 110, which can be accomplished by having the host system 100 create a unique session ID (discussed below) for each individual monitoring session, and the unique session ID may be created by using, e.g., the host's 100 World Wide Node Name (WWNN).

FIG. 2A illustrates examples of host operating system (OS) 101 and control unit 110 access monitoring requests in accordance with exemplary embodiments. Both the host operating system 101 and the control unit 110 provide support for the various access monitoring requests 200 shown in FIG. 2A. The host access monitoring function 105 may receive the access monitoring requests 200 from a requestor and then transmit the requests 200 to the control unit 110 via I/O connections 107. The request types may include: create, join, leave, remove, become an owner of an access monitoring session, and/or query information about one or all access monitoring sessions.

For example, the host OS access monitoring function 105 accepts requests from authorized applications 103 and/or operating system components 102 (i.e., requestors). An example of an operating system component 102 is the ICKDSF (IBM® Device Support Facility) utility program, which is a component of the z/OS® operating system. FIG. 2B illustrates the request parameters 201 received and/or generated by the host OS access monitoring function 105, and/or received by the control unit access monitoring function 112. The host OS access monitoring function 105 is configured to determine the values for the request parameters 201 based on the type of request, and/or the parameters 201 for the particular authorized application 103 and operation system components 102 may be predefined. Also, part or all of the parameters 201 may be received by the host OS monitoring function 105 from the requesting application 103 and/or operating system components 102. The host OS access monitoring function 105 utilizes (e.g., creates and maintains) the host OS access monitoring session table 104 to keep track of (store) the access monitoring sessions (which could be numerous) that the host system 100 creates and/or joins. The host access monitoring function 105 is configured to build a special I/O command to pass the request with parameters 201 (shown in FIG. 2B) to the control unit 110. The control unit access monitoring function 112 receives and processes the request in the I/O command from the host OS monitoring function 105, saves information (parameters 201) about the monitoring session (of the host system 100) in the control unit access monitoring session table 113 (to correspond to the particular requesting host system 100), and returns the status of the request to the host system 100, which may be a success or failure. Note that the status can include other information about the monitoring session.

For each access monitoring session entered as an entry in the host OS access monitoring session table 104 by the host OS access monitoring function 105, a corresponding entry is entered in the control unit access monitoring session table 113 by the control unit access monitoring function 112 of the control unit 110 to which the request was issued. The monitoring session of the host system 100 (for hosts A, B, and/or C) corresponds to the same monitoring session of the control unit 110 (e.g., based on the session ID). Depending upon the request type shown in request 200, the host OS access monitoring function 105 may update the host OS access monitoring session table 104. The table 104 is updated for all the request types except "Query". The host OS access monitoring function 105 may then return the status (success or failure) of the request to the issuing program, such as the OS component 102 and/or the authorized application 103. The processing for each type of request 200 is further described below.

Referring to FIG. 2B, the following parameters 201 are included in an access monitoring request received by, e.g., the host OS access monitoring function 105 to be transmitted to the control unit 110, depending on the request type 200. The requests (e.g., in I/O instruction(s) over the I/O connection 107) to the control unit access monitoring function 112 from the host OS access monitoring function 105 may originate from the authorized applications 103 and/or the operating system (OS) component 102.

Function: The function relates to the type of request create, join, leave, remove, become an owner of an access monitoring session, and/or query information about one or all access monitoring sessions. The request types 200 are illustrated in FIG. 2A and further described below.

Session ID: The session ID (identification) is unique and may be required for all requests types 200 except create and query with query type all.

Control unit ID: The control unit ID is (only) for a request to the host OS access monitoring function 105 made by the application 103 and/or OS component 102. The control unit ID (e.g., the control unit number in IBM zSeries®) identifies the control unit 110 (having the volume 115) on which the data to be monitored (such as, e.g., the monitored data 116) resides. The control unit ID may be required for a create request received by the host OS access monitoring function 105. Also, the control unit ID may be required for a join request, unless the host OS 101 identifies the control unit 110 from the session ID. The control unit ID may also be required for a query request.

Notify exit address: The notify exit address may be utilized (only) for a request to the host OS access monitoring function 105 from the application 103 and/or OS component 102. The notify exit address is the address of the requestor program (such as the authorized applications 103 and/or OS component 102) provided by the requestor program which the host OS access monitoring function 105 will invoke for a notify action (described below) and other notifications from the control unit 110.

Query type: The query type is (only) for a query request. The query type specifies whether data is returned for a single monitoring session and/or for all monitoring sessions (of the control unit 110). There may be numerous monitoring sessions in table 113, and a request for all sessions could be asking for information about each monitoring session table 113.

Scope: The scope determines whether the type and actions apply to all I/Os from a host (which is the host scope) 100 and/or can be overridden for individual I/O requests (which is the request scope). Host scope means the checking by the control unit access monitoring function 112 applies equally to all I/Os from a given host. That is, the type and actions for each host 100 determine whether the control unit 110 takes any action for the I/O, and this cannot be overridden. Request scope means everything works the same as for host scope, except that for an individual I/O request any control unit actions can be bypassed (by including the session ID in the I/O request).

Type for this host (for a particular host 100 such as, e.g., host A): The type specifies the kind of access to data that is checked by the control unit access monitoring function 112. "None" means no checking is done for write access and read access to, e.g., the monitored data 116 for this host (e.g., host A). "Write" means read access is not checked for this host, but write access is checked for this host (e.g., host A). "All" means both read and write access is checked for this host (host A). This type of access applies to the host 100 (e.g., host A) that issued the request.

Additionally, there is a type (e.g., none, write, and/or all) for all other hosts 100 (e.g., hosts B and C). This type applies to all attached hosts other than the host (e.g., host A) that (initially) issued the request. Also, another host (such as host B) can change its own type specifying its kind of access (to a different type) with a join request. Such as, e.g., host B can change its type from "all" to "none" (or any type of desired change) with a join request.

Actions for this host (e.g., host A): The actions specify what the control unit 110 is to do when a host I/O command (issued from host A) will access data (e.g., monitored data 116 on the volume 115) that is not allowed by an access monitoring session. The "prevent" action means the control unit 110 will not let the I/O command (issued by host A) access the data. The "notify" action means the control unit 110 will let the I/O command (issued by host A) access the data, but will notify the owner (host A) of the access monitoring session of the access. This action applies to the host 100 that issued the request (such as, e.g., host A).

Actions for all other hosts: These actions apply to all attached hosts (such as host systems B and C) other than the host (e.g., host system A) that issued the (initial) request. The actions can be prevent or notify. Also, another host 100 (such as host B) can change its own actions with a join request from the host OS access monitoring function 105 to the control unit access monitoring function 112.

Ownership type: The ownership type determines how many owners a monitoring session can have at once and whether another host 100 can take over ownership. "Single" means there is only one owner for the session which is the host system 100 (such as host system A) that created the session and "takeover" of the monitoring session by another host 100 (such as host systems B and C) is not allowed. "Single with alternates" means there is a single owner (e.g., host A) for the session but other hosts 100 (such as hosts system B and C) can join the session as "alternates". An alternate owner can request to become the owner, so host B can request to become the owner of the monitoring session instead of host A. "All joined" means that the host 100 (such as host A) that creates the session plus every host 100 (such as hosts B and C) that joins the session is considered an owner of the session (i.e., if host A creates the session and hosts B and C join the session, then hosts A, B, and C are all owners). "All attached" means that every attached host 100 (via I/O connections 107) is considered an owner of the session. So if host A (the monitoring session owner) creates the monitoring session on control unit 110 and hosts B and C have an I/O connection 107 to the control unit 110, then hosts B and C are considered session owners along with the host A. Other ownership types could also be defined in accordance with exemplary embodiments.

Owner: The owner indicates whether the host 100 (such as host A) issuing the request is to be a session owner (yes), not an owner (no), and/or an alternate (alternate). A create request by, e.g., the host OS access monitoring function 105 of host A 100 must specify yes. Optionally, if no owner is specified to the control unit access monitoring function 112 by the create request of the host OS access monitoring function 105 of host A, the control unit access monitoring function 112 may be configured (as a default) to automatically recognize the create request as yes.

Volume/range list: The volume/range list defines the data to be monitored on the control unit 110, such as the monitored data 116 on volume 115. It is contemplated that there could be numerous monitored data 116 on numerous different volumes 115. At least one volume (number) and one data range (start to finish) must be specified. A volume is identified by a volume ID, such as the volume ID 5010 in FIG. 2C, and the data range may be identified by the data range 02500 to 03200 (start of data to end of data) as shown in FIG. 2C. This volume ID and data range combination may be represented by volume/range, and the monitored data 116 depicts an example of an identified volume ID for a particular data range. The volume ID used for the host OS access monitoring request (received by the host OS access monitoring function 105) can have a different form than the volume ID used for the control unit access monitoring request (received by the control unit access monitoring function 112), but the two must map one-to-one. The host OS access monitoring function 105 does the translation. In FIG. 1, the monitored data 116 is illustrated as the data being monitored in volume 115 of the numerous volumes 114, and it is understood that the entire volume 115 could be monitored and/or multiple data ranges of data in the volume 115 can be monitored. A data range is defined by a start address and end address (e.g., in the volume 115), such as a starting and ending block ID or a starting and ending CCHHR in the IBM extended count key data (ECKD™) architecture (cylinder number (CC) and head number (HH) identifies a track on a volume, record number (R) identifies a record on a track).

The starting block may be 02500 and the ending block may be 03200 for volume 5010 shown in block 221a of FIG. 2C. Note that data ranges of the volume 115 are distinct with no overlap.

Now turning to FIG. 2C, FIG. 2C illustrates an example of a host OS access monitoring session table 104 with four entries (four rows) in accordance with exemplary embodiments. It is understood that each and/or any of the host A, B, and C may have an access monitoring session table 104 maintained (created and updated) by the host OS access monitoring function 105. The host OS access monitoring session table 104 may include, e.g., the following information: session ID, control unit ID (which identifies the particular control unit 110 out of a plurality of control units 110), notify exit address, scope, this host type and actions, all other hosts type and actions, ownership type, owner, and/or volume and range list address (to identify the particular monitored data range 116). Note that although various volumes and control units are illustrated in the host OS access monitoring session table 104, for explanation purposes the volumes 114 may be representative of the various volumes and the control unit 110 may be representative of the various control unit IDs that identify various control units.

Note that each row in tables 104 and 113 is a session having a session ID. Accordingly, each row of the host OS access monitoring session table 104 is a different monitoring session having a corresponding session ID. In the host OS access monitoring session table 104 (which may be displayed on a display device of the host 100), the first monitoring session (in table 104) which is session ID CUWWNN5-0001 is for control unit 5000, which is not illustrated for the sake of clarity but represented as the control unit 110. This monitoring session (requested by, e.g., host A) prevents writes by all other hosts (e.g., hosts B and C) to a file defined (in the volume/range list 221a) as residing on volume 5010 in the range 02500 to 03200. By join requests, other hosts (such as hosts B and C) are allowed to become alternate owners that can takeover ownership of this session, session ID CUWWNN5-0001, because the ownership type is "single with alternates". Since the type is "none" (which means no restrictions for read and/or write) for this host A, there are no actions applicable (i.e., n/a) when this host A performs a read and/or write. Note that the type "none" also applies to the second and third sessions discussed below.

The second session (in the second row of table 104) which is session ID CUWWNN3-0012 is for control unit 3000. The volume/range list 221b for this session monitors data on two (different) volumes: (1) volume 3124 for the data range 00500 to 00650 and data range 01800 to 02000, and (2)

volume 3513 for the data range 18008 to 18520. For example, the host A is this host, and the control unit 3000 (represented as control unit 110) will notify this host A if another host (such as host B or C) writes to the monitored data (e.g., monitored data 116), since all other hosts type is "write" and action is "notify". The host OS access monitoring function 105 of the host A will then call the requestor's notify exit address at the address 7F002128, which may be the address for application 103 and/or OS component 102. Only this host, e.g., host A can own the session because the ownership type is "single".

The third session (shown as the third row in table 104) which is session ID CUWWNN5-0007 is for control unit 5000 (which can be represented by control unit 110). This session monitors data on volume 5053 for the data range 02100 to 02200. The control unit 110 (representing control unit 5000) will notify this host (e.g., host A) if another host (e.g., host B and/or host C) attempts to read and/or write to the monitored data 116 but the other host is not prevented from reading and/or writing. The host OS access monitoring function 105 (for host A) will then call the requestor's notify exit at the address 7B220020. Only this host (which is host A) can own the session because the ownership type is "single".

The fourth session (shown as the fourth row in table 104) which is session ID CUWWNN5-0002 is for control unit 5000 (which is represented by the control unit 110). This session monitors data (for example, the volume directory (e.g., Volume Table of Contents (VTOC) in the IBM z/OS® operating system)) on volume 5906 defined by the range 01100 to 01900. For example, the control unit 110 (representing control unit 5000) prevents all reads and writes (by this host A and by all other hosts B and C) to this monitored data 116 unless the I/O permissions command (see below) includes this session ID CUWWNN5-0002. Every host (e.g., host A, B, and C) that joins this session (session ID CUWWNN5-0002) is an owner because the ownership type is "all joined".

FIG. 2D shows an example of the control unit access monitoring session table 113 with four entries (four rows) in accordance with exemplary embodiments. Each row represents a different monitoring session. This control unit access monitoring session table resides in the control unit known to the host systems as control unit 5000 (but may be represented as the control unit 110). The host system 100 with the host OS access monitoring session table 104 of FIG. 2C is known to this control unit 5000 as Host 1.

The first session (session ID CUWWNN5-0001) was created by Host 1 (such as, e.g., host A). Host 1 is allowed to access the monitored data 116, specified in the volume/range list 226a. Host 2 (such as, e.g., host B) joined this session as an alternate and set its Type to "none" so that host 2 is also allowed to access the monitored data 116, which is volume/range 226a (volume 5010 for data range 02500 to 03200). Host n (e.g., host C) has not joined this session and has the default Type and Actions for this session of "write" and "prevent"; Host n (host C) is not allowed write access to the monitored data 116. Host n has the option of joining this session (session ID CUWWNN5-0001). Because the ownership type is "single with alternates", host n can join as an alternate owner (as Host 2 has done) by issuing join request in an I/O command (via its host access monitoring function 105) with the session ID CUWWNN5-0001.

The second session (session ID CUWWNN5-0015 in the second row) was created by Host 2 (such as, e.g., host B). Note that this session is not in Host 1's (host A's) OS access monitoring session table 104 but in Host 2's OS access monitoring session table 104. The volume/range 226b is for two different volumes 5002 and 5018 (represented as volume 115). In FIG. 2D, the data monitored is on volume 5002, for data range 10020 to 10130 and data range 16040 to 16450, and on volume 5018, for data range 18008 to 18520 and data range 20340 to 20850. This second session prevents write access to the volume/data ranges 226b by all hosts (such as, e.g., hosts A and C) except Host 2 (e.g., host B). Only Host 2 can own this session because the ownership type is "single" and in the type/action/owner column the type is "none" meaning host 2 is not restricted, action is "n/a" because there is no action to relate to the type "none", and the owner is host 2 (e.g., host B). The type/action/owner for Host 1 (e.g., host A) and Host n (e.g., host C) are both type "write", action "prevent" meaning Host 1 and Host n are prevented from write actions (but can read), and the owner is "no" meaning that Host 1 and Host n cannot become owners (even with a join request).

The third session (session ID CUWWNN5-007 in the third row) was created by Host 1 (e.g., host A) and host 1 is the owner. Host 1 is allowed to access the volume/data range 226c (represented as monitored data 116), which is volume 5053 for data range 02100 to 02200. Since the type is "none" for Host 1, Host 1 has no restrictions (Host 1 can read and write) and thus the action is "n/a". Host 2 (e.g., host B) joined this session and set its Type to "write" with the join request, but Host 2's action field is automatically (default) set to "notify" by Host 1 and/or the control unit 110. Host 2 can also read. Host 2's owner field is set to "joined" because Host 2 (e.g., host B) joined the session (with a join request including the session ID CUWWNN5-007) but Host 2 is not an owner like Host 1 because the Ownership Type is sent to "single". The control unit (identified as control unit 5000 in FIG. 2C but represented by the control unit 110) will notify Host 1 (e.g., host A) if Host 2 (e.g., host B) attempts to write to the monitored data 116. The control unit 110 will notify Host 1 if any other Host n (such as, e.g., host C) attempts to read or write to the monitored data 116. Only Host 1 can own this session because the ownership type field is "single".

The fourth session (session ID CUWWNN5-0002 in the fourth row) was created by Host 1 (again, e.g., host A). As seen in the Type and Actions fields for Hosts 1, 2 and n, this session prevents reads or writes to volume 5906 for data range 01100 to 01900 (monitored data 116) by any host unless the I/O permissions command of the host contains this session ID, session ID CUWWNN5-0002. Any hosts, such as Host 2 (e.g., host B), that have joined this session are owners. Host n (e.g., host C) has not joined this session and is not an owner.

Figure 3A:
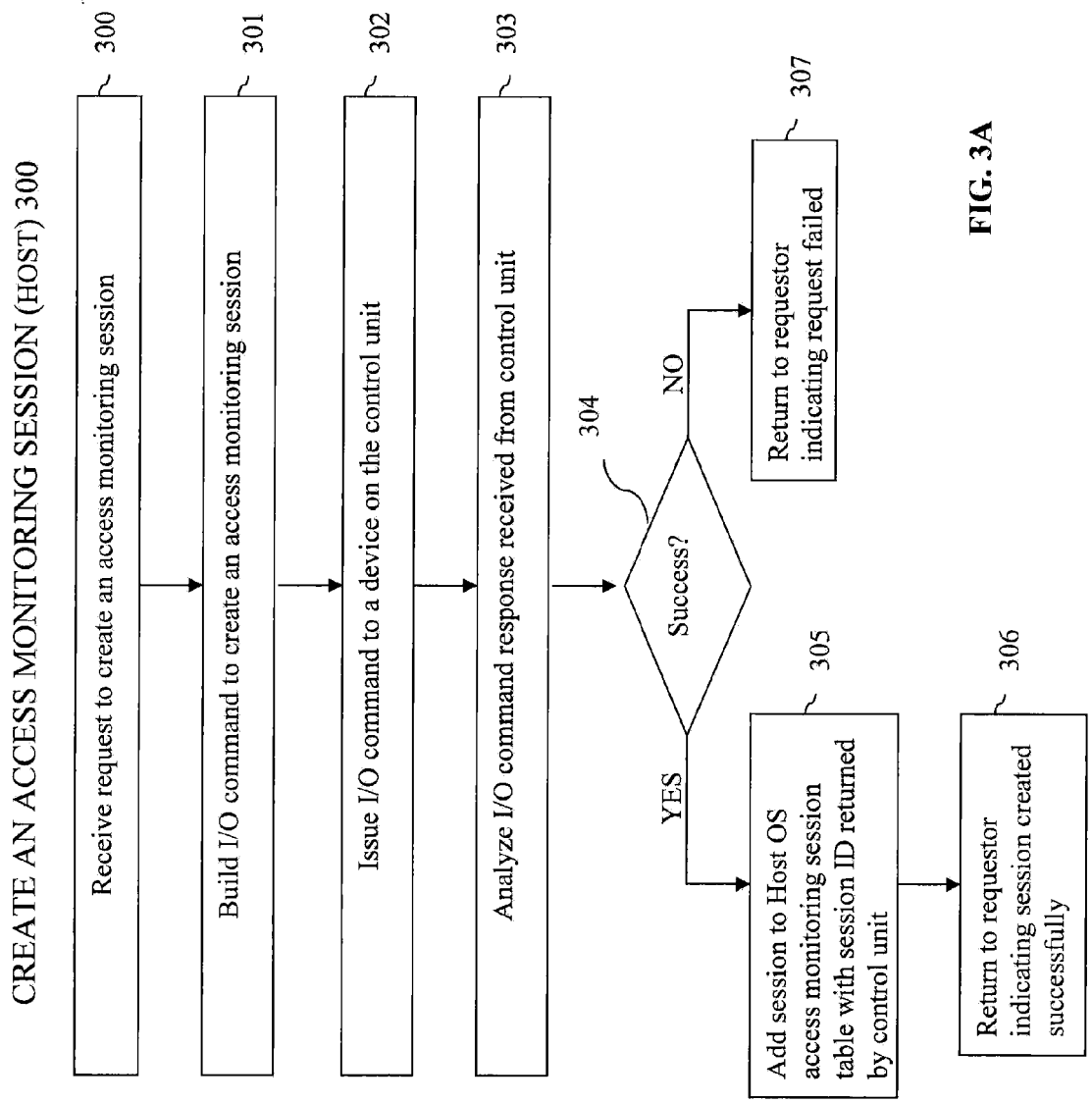
FIGS. 3A, 3B, and 3C illustrate flow charts in accordance with exemplary embodiments.
Figure 3B:
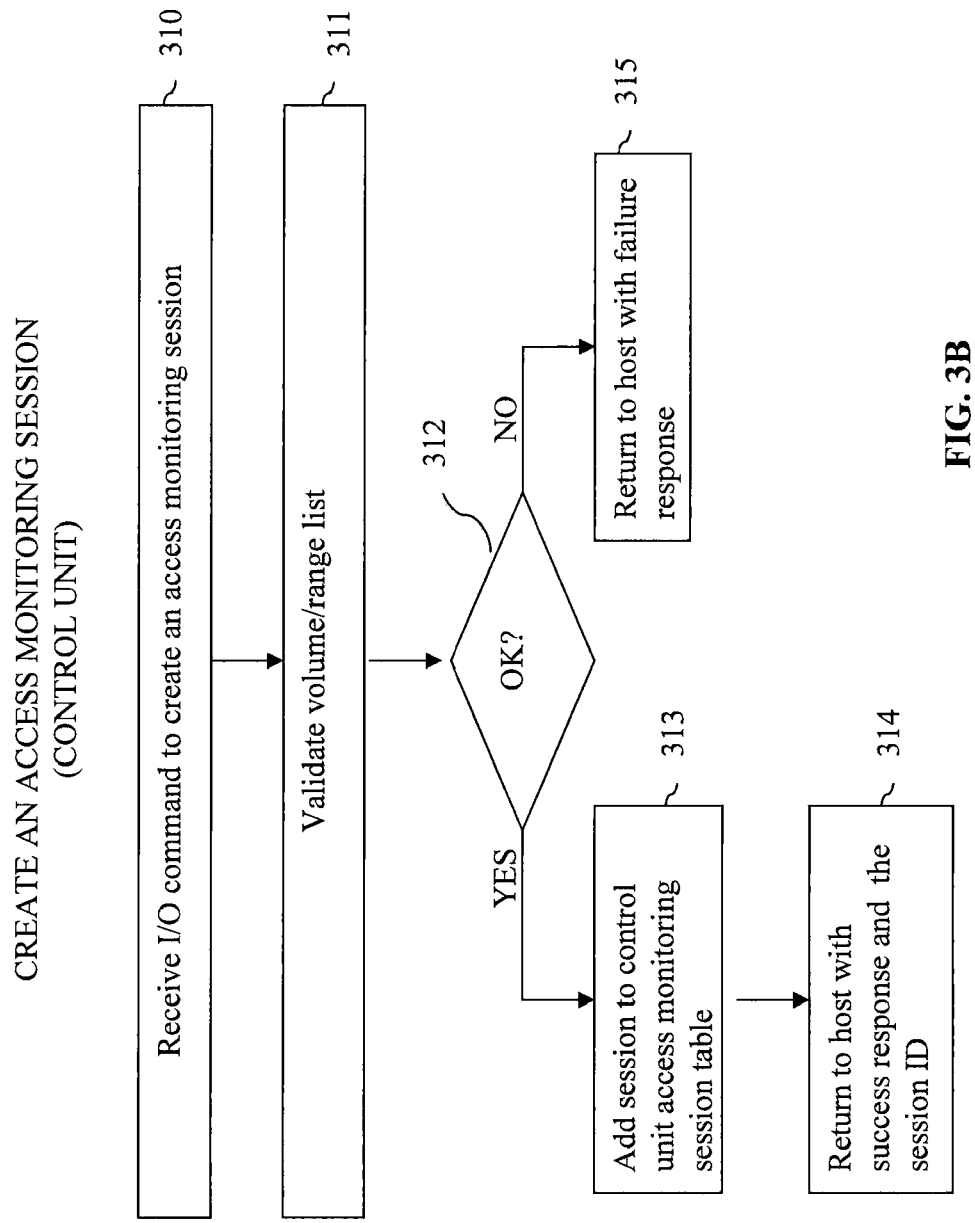
Figure 3C:
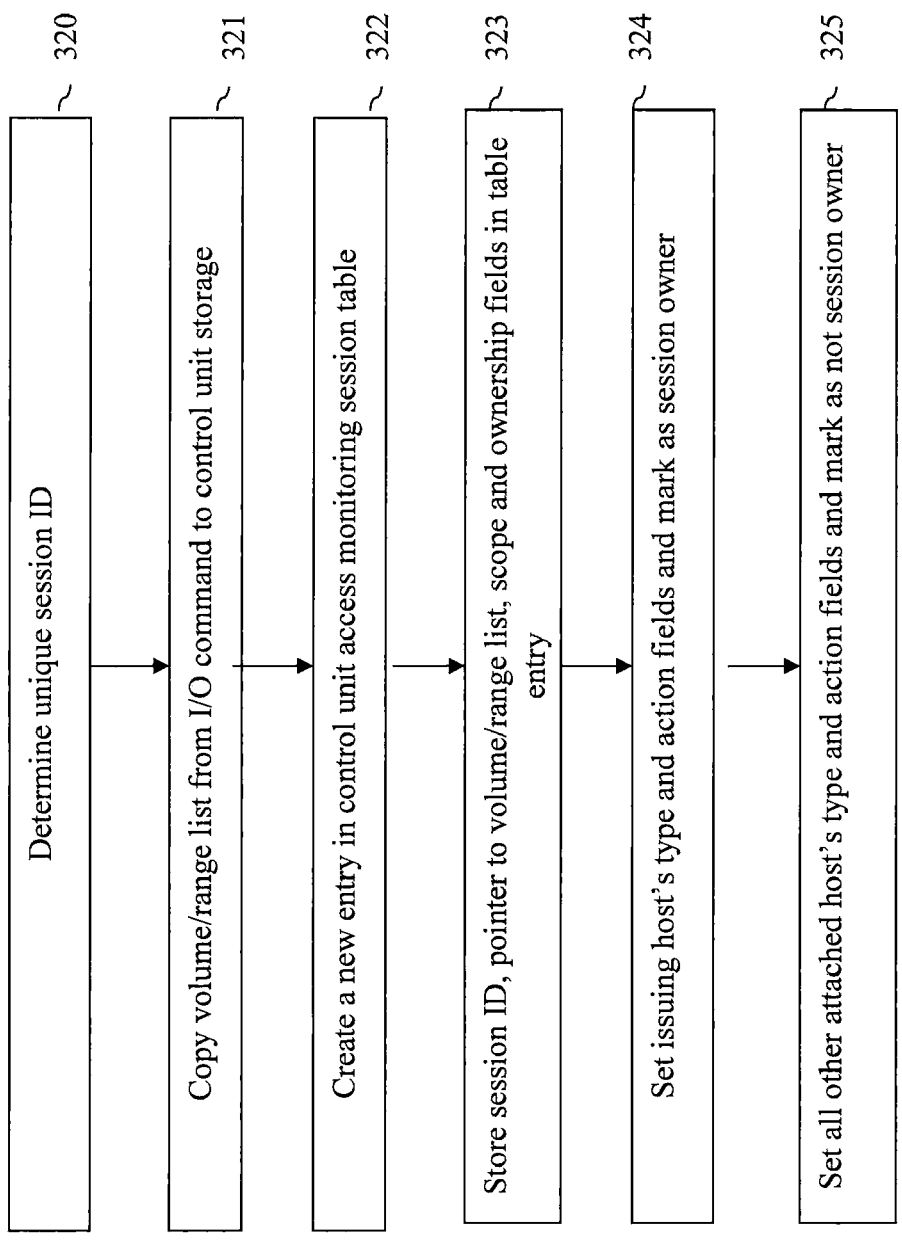

The following are examples of host OS and control unit access monitoring requests 200 depicted in FIG. 2A. FIGS. 3A, 3B, and 3C relate to creating access monitoring sessions for tables 104 and 113 in accordance with exemplary embodiments. Although shown separately for illustrative purposes, the flow charts of FIGS. 3A, 3B, and 3C may be interrelated in creating the monitoring sessions.

FIG. 3A illustrates a flow chart for creating an access monitoring session by the host OS monitoring function 105 in accordance with exemplary embodiments. Referring to FIG. 3A, the host OS access monitoring function 105 receives a request to create an access monitoring session from, e.g., the authorized applications 103 and/or the OS component 102 at operation 300.

All the request parameters 201 are required (generated by the host OS access monitoring function 105 and/or the requestors 102, 103), except the Session ID and Query type. The host OS access monitoring function 105 builds an I/O command to pass (submit) the create request to the control unit 110. All the request parameters 201 from the host request of the host OS access monitoring function 105 are included in the control unit request to the control unit 110, except the Session ID and those parameters that only apply to host OS requests. The host OS access monitoring function 105 then issues the I/O command to a device (such as the volumes 114) on the control unit 110 at operation 302. For example, on IBM System zSeries® the I/O command would be issued to any volume 115 (of the volumes 114) on the control unit 110.

After the host OS access monitoring function 105 transmits the create request (I/O command) to create the access monitoring session, the host OS access monitoring function 105 waits to receive a response (I/O command response) from (the control unit monitoring function 112 of) the control unit 110, and the host OS access monitoring function 105 then analyzes the I/O command response from the control unit 110 in operation 303.

The host OS access monitoring function 105 determines if the I/O command response from the control unit 110 is "yes" (success) to the request to create the monitoring session or a "no" (failure) to the request to create the monitoring session in operation 304. The response (i.e., success or failure) to the host 100 from the control unit 110 is described further with reference to FIG. 3B.

If the I/O command failed (no), the host OS access monitoring function 105 returns to the requestor (e.g., the authorized application 103 and/or the OS components 102) an indication of failure at operation 307. Otherwise, if the host OS access monitoring function 105 receives a yes (success) from the control unit access monitoring function 112, the host OS access monitoring function 105 creates a new entry in the host OS access monitoring session table 104 and saves the session information, including the session ID received from the control unit access monitoring function 112 of the control unit 110 at operation 305. Return (notification) is then made by the host OS access monitoring function 105 to the requestor indicating that the session was created at operation 306. The session ID can also be provided on the return to the requestor.

Referring to FIG. 3B, FIG. 3B illustrates a flow chart for creating an access monitoring session by the control unit access monitoring function 112 of the control unit 110 in accordance with exemplary embodiments. The control unit access monitoring function 112 of the control unit 110 receives the I/O command (from the host OS access monitoring function 105) to create an access monitoring session at operation 310. The control unit access monitoring function 112 validates the volume/range list at operation 311. Validation by the control unit access monitoring function 112 includes checking that all volume IDs refer to valid volumes (such as the volumes 115), that each data range is within the bounds of the volume (e.g., the volume 115) and that data ranges on a volume (volume 115) do not overlap. Validation by the control unit access monitoring function 112 also includes a comparison with the volume/range lists for any existing sessions (in the table 113) to ensure there is no conflict. For example, a data range in the new session is allowed to be the same as, or a subset of, an existing data range being monitored in a session. However, a data range in the new session is not allowed to overlap only part of one existing data range along with part of a second existing data range. Such validation rules are designed to simplify the implementation and streamline processing. If the validation fails by the control unit access monitoring function 112, the control unit access monitoring function 112 of control unit 110 returns a failure (i.e., correlating to the "no" in operations 304 and 307 in FIG. 3A) response to the host OS monitoring function 105 of the host 100 at operation 315. If validation succeeds (i.e., correlating to the "yes" in operations 304-306 in FIG. 3A), the control unit access monitoring function 112 of control unit 110 adds the session information as a new entry in the control unit access monitoring session table 113 at operation 313.

The control unit access monitoring function 112 of control unit 110 then returns to the host 100 indicating success (i.e. "yes" for operations 304, 305, and 306) and provides the new session ID in the response (to the host 100) at operation 314. The control unit access monitoring function 112 returns (transmits) data such as the session ID to the host OS access monitoring function 105 via a read command associated with the (original) access monitoring request to the control unit 110. The read command can be included with the command for the access monitoring request and/or can be a separate command that follows the command for the access monitoring request. For example, in IBM System zSeries®, the read command could be done with another special I/O command that is command chained to the access monitoring request I/O command.

In more detail and referring to FIG. 3C, FIG. 3C is a flow chart illustrating how to add the monitoring session to the control unit access monitoring session table 113 in accordance with exemplary embodiments. The control unit access monitoring function 112 determines a unique session ID at 320. One way to ensure uniqueness of the session ID across all attached hosts 100 is to include a globally unique identifier assigned to the control unit 110. For example, the World Wide Node Name (WWNN) in the ANSI Fiber Channel or the Node Descriptor (ND) in IBM System zSeries® may be included as part of the session ID. Adding a sequence number then provides for a large number of unique session IDs. The host systems 100 can use the globally unique identifier in the session ID to identify the control unit 110. This allows the session to be shared by multiple host systems 100 by communicating only the session ID. (The host systems can also communicate the control unit ID, if needed to simplify implementation.)

After determining the new session ID, the control unit access monitoring function 112 copies the volume/range list (e.g. the volume/range list 221a in the table 104 in FIG. 2C) for storage. Storage for the volume/range list (which is volume/range list 226a in the table 113 of FIG. 2D) is obtained in the control unit function 111 and the volume/range list is saved at operation 321. The control unit access monitoring function 112 creates a new entry in the control unit access monitoring session table 113 at operation 322. The control unit access monitoring function 112 stores the session information not specific to a host in the new session table entry (e.g., a row in table 113 in FIG. 2D) at operation 323. The control unit access monitoring function 112 sets the Type and Action fields for the host 100 (e.g., host A) that issued the I/O command, and the control unit access monitoring function 112 marks that host 100 as the owner of the session at operation 324. The control unit access monitoring function 112 of the control unit 110 can identify which host 100 issued a command by the I/O connection 107, and/or set of I/O connections 107, over which the command was sent (e.g., the PathGroup ID in IBM System zSeries®). The Type and Action fields are set by the control unit access monitoring function 112 for all other attached hosts 100 (e.g., hosts B and C), and their Type and Action fields are marked as not a session owner (unless the Ownership is "all attached") at operation 325. Note that the control unit access monitoring session table 113 can be of fixed width because the maximum number of attached hosts is known by the control unit 110, for example, based on the maximum number of physical and/or logical host I/O connections 107 supported.

Figure 4A:
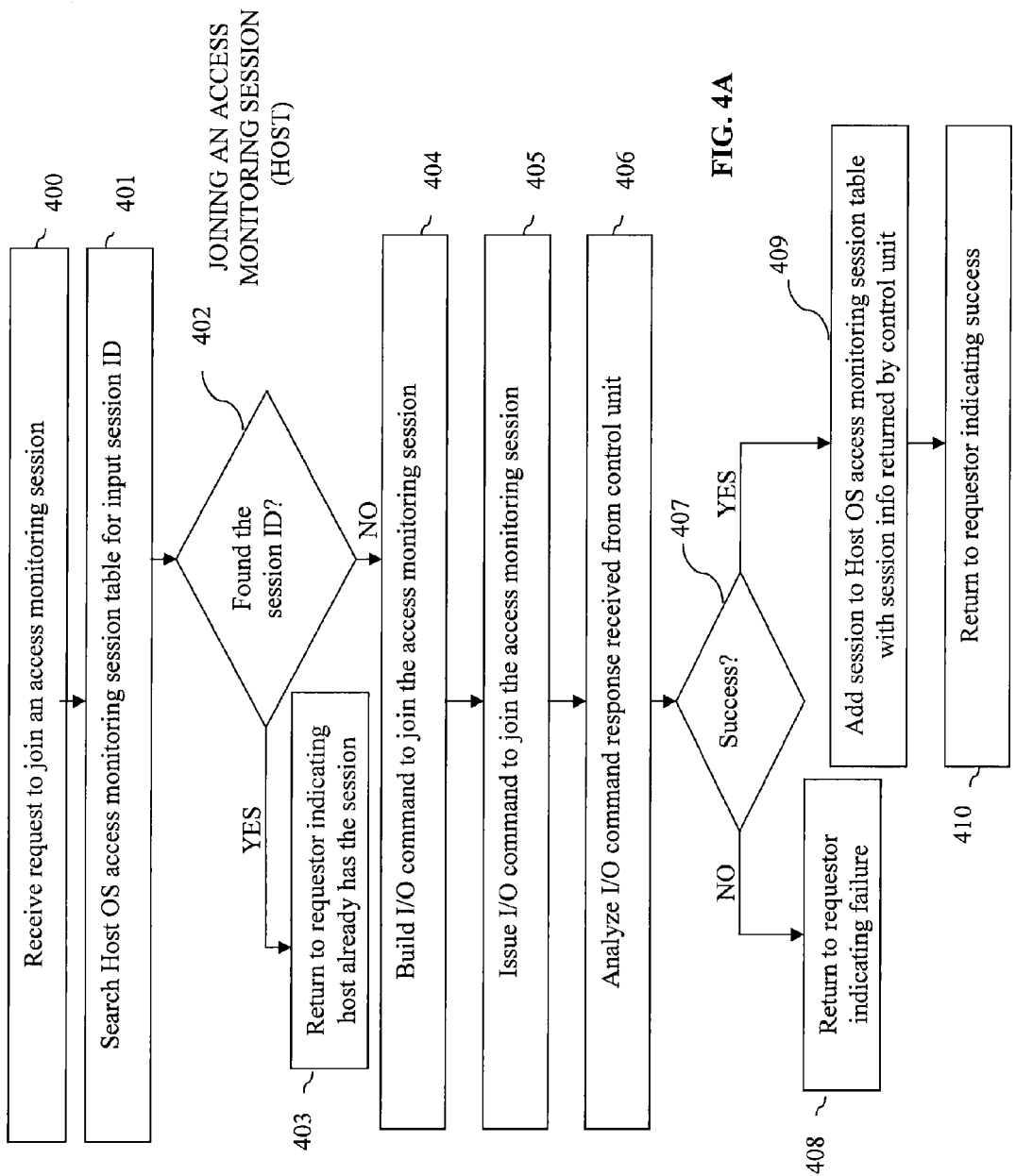
Figure 4B:
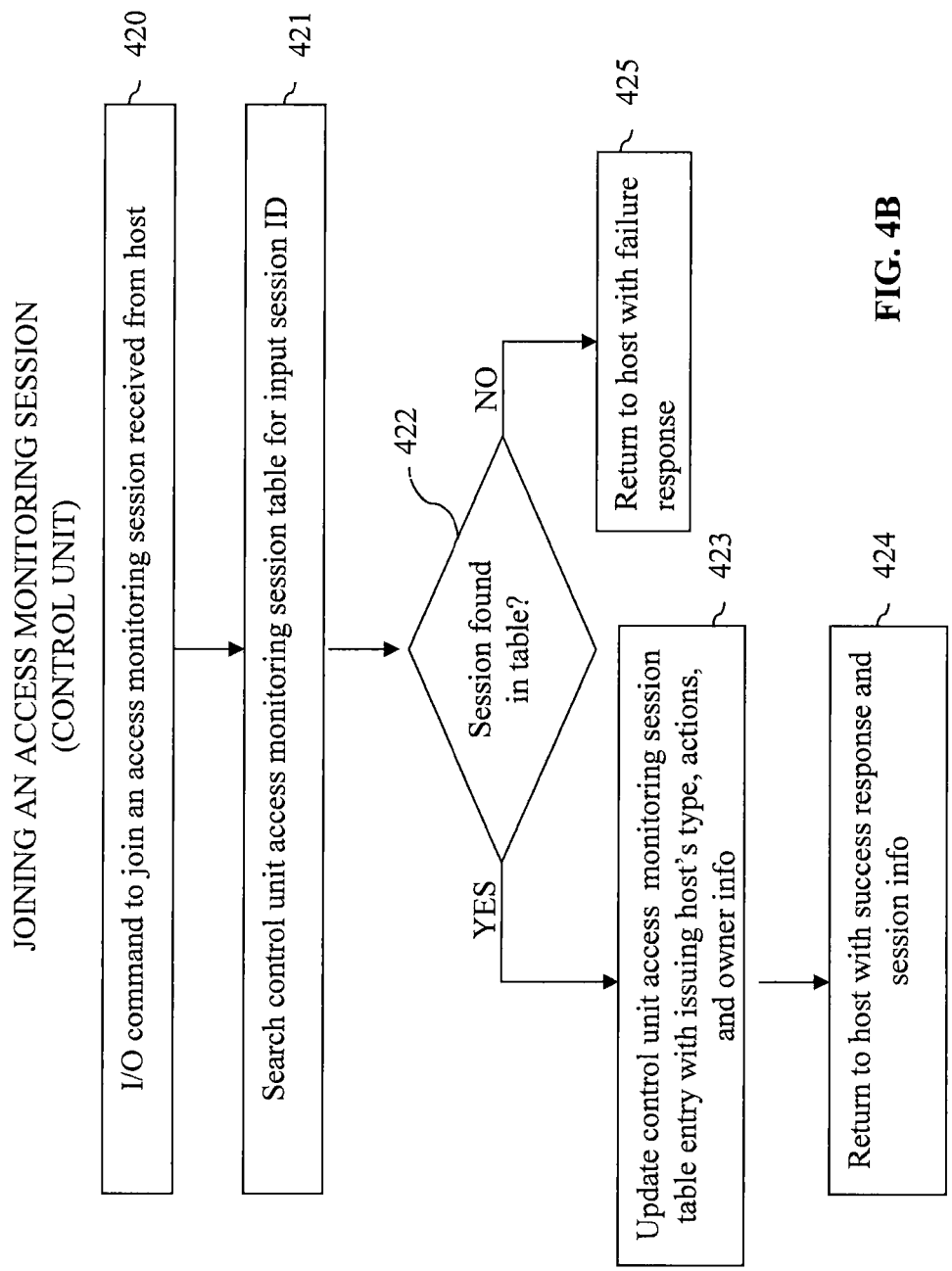

FIGS. 4A and 4B relate to joining an access monitoring session in accordance with exemplary embodiments. FIG. 4A is a flow chart illustrating join operations of the host OS monitoring function 105, and FIG. 4B is a flow chart illustrating join operations of the control unit access monitoring function 112 according to exemplary embodiments. Although shown separately for simplicity, note that the flow charts of FIGS. 4A and 4B may be interrelated.

Referring to FIG. 4A, the host OS access monitoring function 105 receives a request (from the requestor, e.g., the authorized applications 103 and/or OS component 102) to join an (existing) access monitoring session at operation 400. The request parameters 201 may include the session ID, control unit ID if needed, Type and Actions for this host 100 requesting to join, and Owner. In the request parameters 201, the Type, Actions and Owner parameters can be omitted if the requestor does not want to (or is set not to) change them. The host OS access monitoring function 105 searches the host OS access monitoring session table 104 for the input session ID at operation 401.

The host OS access monitoring function 105 is configured to determine if the session ID is found in the host OS access monitoring session table 104. If the session for the session ID is already in the host OS access monitoring session table 104, return is made to the requestor by the host OS access monitoring function 105 indicating that this host 100 (e.g., host A) has already joined the session and/or is the session owner at operation 403. If the input session ID is not found in the table 104, the host OS access monitoring function 105 is configured to build a special I/O command to pass the join request to the control unit 110 at operation 404. The request parameters 201 include the session ID, Type and Actions for this host 100 (e.g., host B not already joined) and Owner (the owner may or may not be the particular host 100). The Type, Actions and Owner parameters are omitted if they were omitted in the host request to the host 100. The I/O command (requesting permission to join) is issued to a device (such as the volume(s) 114) on the control unit at operation 405.

Now, referring to FIG. 4B, the control unit access monitoring function 112 of the control unit 110 receives the I/O command with the join request from the host OS access monitoring function 105 at operation 420. The control unit access monitoring function 112 searches the control unit access monitoring session table 113 for the input session ID at operation 421. The control unit access monitoring function 112 determines if the session is found in the control unit access monitoring session table 113 for the input session ID at operation 422. If the session (session ID) is not in the control unit access monitoring session table 113, the control unit access monitoring function 112 of the control unit 110 returns a failure response to the host 100 at operation 425. Otherwise, the control unit access monitoring function 112 updates the table 113 entry with the Type, Actions and Owner for this host 100 (if included in the request parameters 201) at operation 423. Note that the Owner parameter on the join request might not be valid depending on the Ownership defined when the session was created. For example, if the Ownership is "single", the Owner parameter on the join request must be "no". If the Owner parameter is invalid, the join request can be rejected and/or the Owner parameter can be ignored by the control unit access monitoring function 112. The control unit access monitoring function 112 of the control unit 110 then returns a success response to the host 100, providing the session information in the response at operation 424.

Now, referring again to FIG. 4A, the host OS access monitoring function 105 checks the response from the I/O command to join the session sent by the control unit access monitoring function 112 at operation 406. The host OS access monitoring function 105 determines if the response from the control unit 110 is a success or failure at operation 407. If the I/O command failed (as indicated/sent to the host 100 from the control unit access monitoring function 112), the host OS access monitoring function 105 returns a failure response to the requestor (e.g., the applications 103 and/or the OS component 102) at operation 408. Otherwise, if the control unit access monitoring function 112 transmits a success response along with session information to the host 100, the host OS access monitoring function 105 creates/adds a new entry to the host OS access monitoring session table 104, and the session ID and session information received from the control unit 110 are saved in the newly added entry at operation 409. A success response is returned to the requestor by the host OS access monitoring function 105 at operation 410.

Figure 5B:
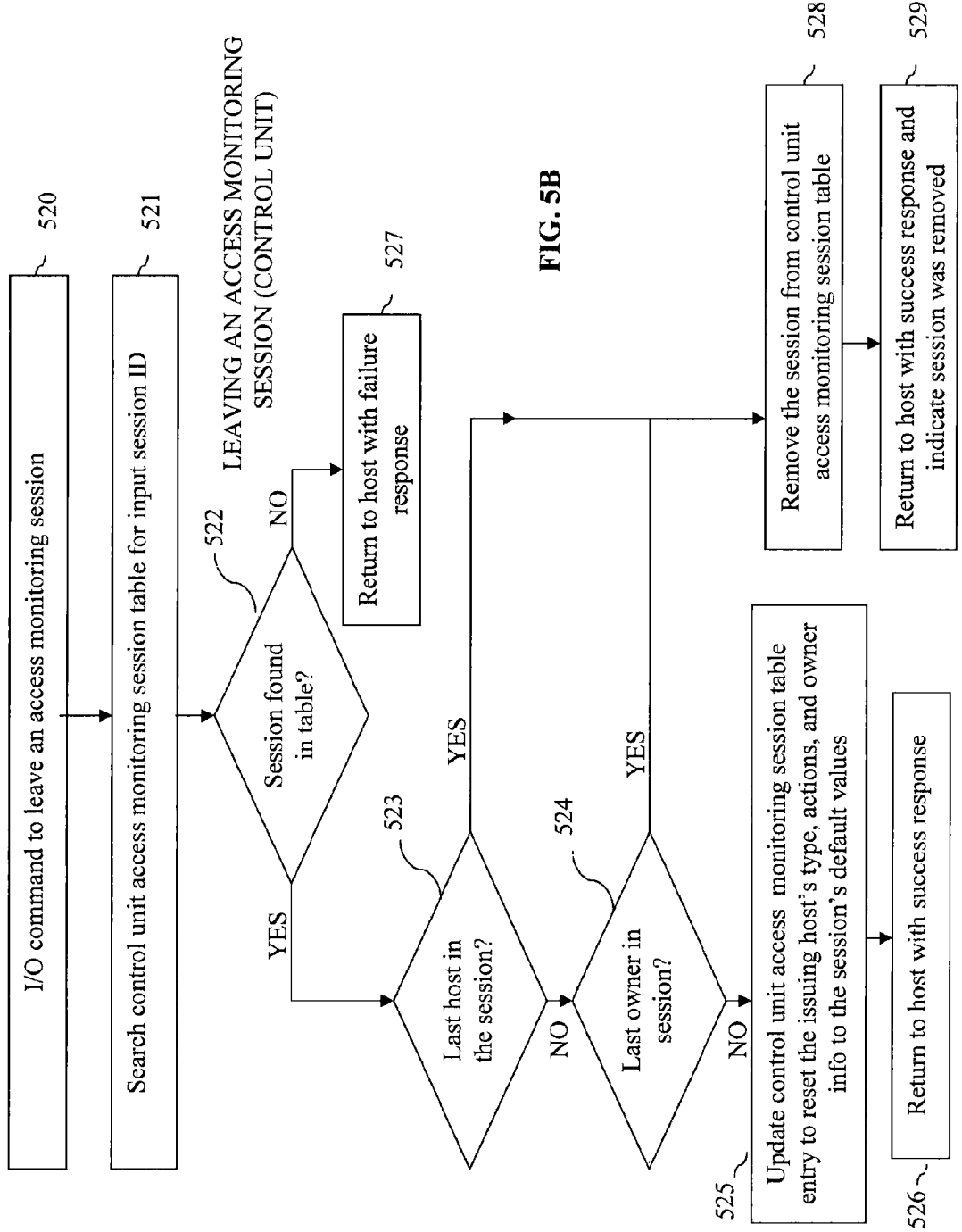

FIGS. 5A and 5B relate to leaving an access monitoring session in accordance with exemplary embodiments. FIG. 5A is a flow chart illustrating leaving operations of the host OS monitoring function 105, and FIG. 5B is a flow chart illustrating leaving operations of the control unit access monitoring function 112 according to exemplary embodiments. Although shown separately for simplicity, note that the flow charts of FIGS. 5A and 5B may be interrelated.

Referring to FIG. 5A, the host OS access monitoring function 105 receives a request (from, e.g., the applications 103 and/or the OS components 102) to leave an existing access monitoring session at operation 500.

The (leave) request parameters 201 include the session ID. The host OS access monitoring function 105 searches the host OS access monitoring session table 104 for the input session ID at operation 501. The host OS access monitoring function 105 determines if the session ID is found in the host OS access monitoring session table 104 at operation 502. If the session (session ID) is not in the host OS access monitoring session table 104, the host OS access monitoring function 105 transmits a return to the requestor (e.g., the application 103 and/or OS components 102) indicating that this host 100 has not joined the session at operation 503. Otherwise, if the session (session ID) is found in the host OS access monitoring session 104, the host OS access monitoring function 105 builds a special I/O command to pass the leave request to the control unit access monitoring function 112 of the control unit 110 at operation 504. The request parameters 201 of the I/O command include the session ID. The I/O command is issued by the host OS access monitoring function 105 to a device (such as the volume 114) on the control unit 110 at operation 505.

Now, referring to FIG. 5B, the control unit access monitoring function 112 of the control unit 110 receives the I/O command with the leave request from the host OS access monitoring function 105 at operation 520. The control unit access monitoring function 112 searches the control unit access monitoring session table 113 for the input session ID at operation 521. The control unit access monitoring function 112 determines if the session ID is found in the table 113 at operation 522. If the session (session ID) is not in the control unit access monitoring session table 113, the control unit access monitoring function 112 of the control unit 110 returns a failure response to the host 110 at operation 527.

If the session (session ID) is found in the control unit access monitoring session table 113, the control unit access monitoring function 112 checks the session table entry data (of table 113) for each host 100 to determine if this (particular host) is the last host 100 in the session at operation 523, and/or if this (particular host) is the last owner of the session at operation 524. If yes to either operation 523 or 524, the control unit access monitoring function 112 removes the session from the control unit access monitoring session table 113 at operation 528. The control unit access monitoring function 112 of control unit 110 then returns to the (particular) host 100 with a success response and an indication that the session was removed at operation 529. The control unit access monitoring function 112 of control unit 110 can also notify all other hosts 100 that joined the session that the session was removed. This can be done by an asynchronous message to those hosts 100 (see example below with reference to FIG. 9B).

If the answer to operation 523 and operation 524 are no, and if the session is not to be removed, the control unit access monitoring function 112 updates the table 113 entry to reset the Type, Actions and Owner data for this host 100 to the original values specified on the Create request for "all other hosts" at operation 525. The control unit access monitoring function 112 of control unit 110 then returns a success response to the host 100 at operation 526. (Note that the control unit provides two success cases for a leave request: a leave request where the session remains (operation 526) and a leave request where the session is removed (operation 529) because the request was issued by the last owner or the last host in the session. The case where the session is removed is permitted to simplify the processing by multiple host systems, for example, if all the host systems (owner(s) and those that have joined) decide independently to leave the session at the same time. If the control unit did not permit the last host to leave the session, that host would get a failure response and would then have to issue a remove request.)

Referring again to FIG. 5A, the host OS access monitoring function 105 checks the response to the I/O command received from the control unit access monitoring function 112 to leave the session at operation 506. The host OS access monitoring function 105 determines if the response received from the control unit access monitoring function 112 is a success or failure at operation 507. If the I/O command is a failure (as indicated from the control unit access monitoring function 112), a failure response is returned by the host OS access monitoring function 105 to the requestor (e.g., the applications 103 and/or OS component 102) at operation 508. Otherwise, if the I/O command is a success (as indicated from the control unit access monitoring function 112), the host OS access monitoring function 105 deletes the session entry from the host OS access monitoring session table 104 at operation 509, and a success response is returned to the requestor (e.g., the applications 103 and/or OS component 102) by the host function 105 at operation 510. The response to the requestor from the host OS access monitoring function 105 can also include an indication that the control unit 110 removed the session from the control unit access monitoring session table 113.

Figure 6B:
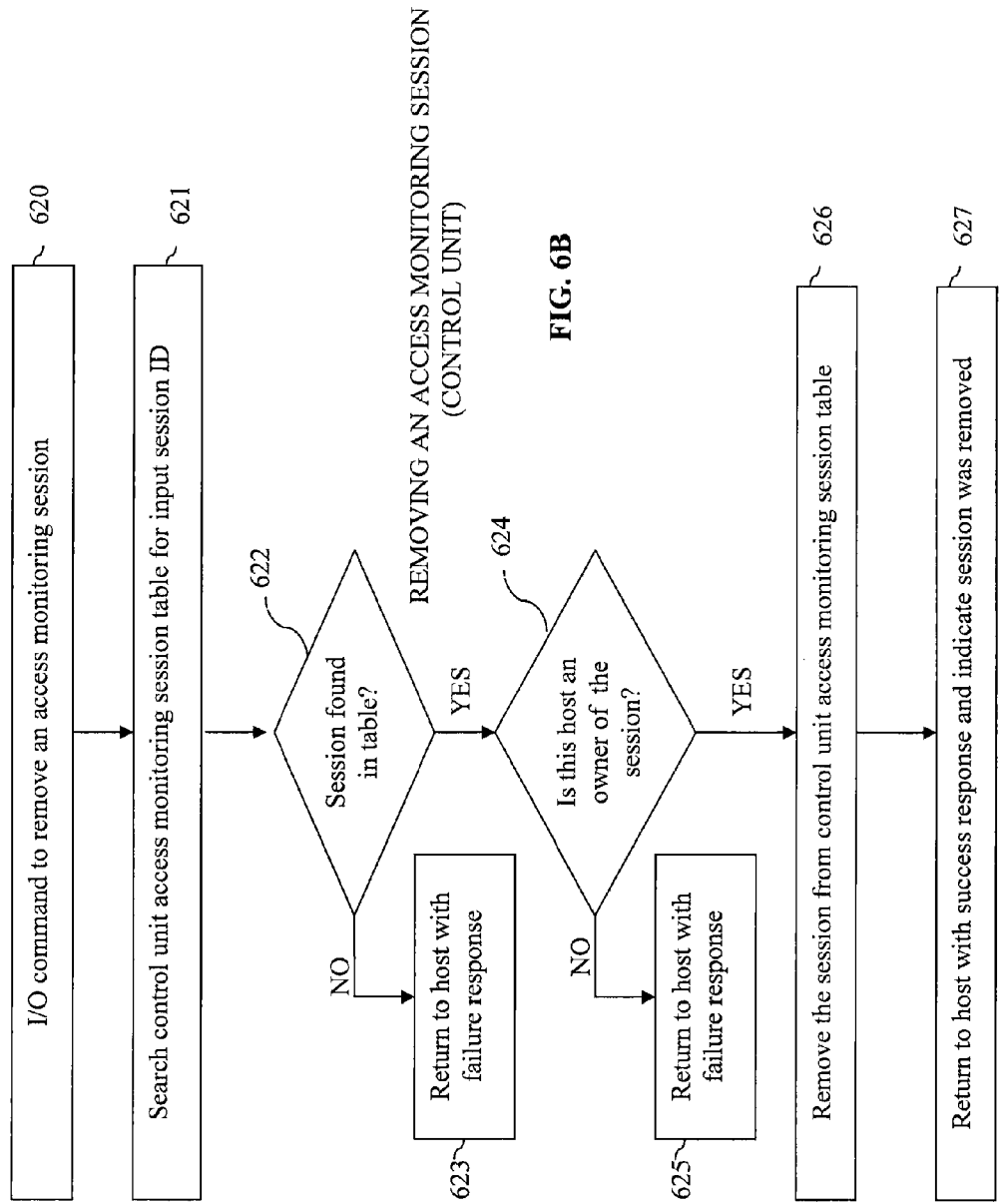

FIGS. 6A and 6B relate to removing an access monitoring session in accordance with exemplary embodiments. FIG. 6A is a flow chart illustrating removing operations of the host OS monitoring function 105, and FIG. 6B is a flow chart illustrating removing operations of the control unit access monitoring function 112 according to exemplary embodiments. Although shown separately for simplicity, note that the flow charts of FIGS. 6A and 6B may be interrelated.

Referring to FIG. 6A, the host OS access monitoring function 105 receives a request (from the requestor, e.g., the applications 103 and/or OS component 102) to remove an existing access monitoring session at operation 600. The request parameters 201 of the request to remove include the session ID. The host OS access monitoring function 105 searches the host OS access monitoring session table 104 for the input session ID at operation 601. The host OS access monitoring function 105 determines if the session for the session ID is found in the table 104 at operation 602. If the session ID is not in the host OS access monitoring session table 104, host OS access monitoring function 105 transmits a return to the requestor (e.g., the applications 103 and/or OS component 102) indicating that this host 100 has not joined the session at operation 603. If the session for the session ID is in the table 104, the host OS access monitoring function 105 checks the table entry of the table 104 to recognize if this host 100 is an owner of the session at operation 604. If this host 100 (e.g., host A) is not an owner, the host OS access monitoring function 105 transmits a return to the requestor (e.g., application 103 and/or OS component 102) indicating that this (particular) host 100 is not an owner at operation 605. Otherwise, if this host 100 (e.g., host A) is an owner, the host OS access monitoring function 105 builds a special I/O command to pass the remove request to the control unit access monitoring function 112 of the control unit 110 at operation 606. The request parameters 201 of the remove request include the session ID. The I/O command is issued from the host OS access monitoring function 105 to a device (e.g., the volume(s) 114 via the control unit access monitoring function 112) on the control unit 110 at operation 607.

Now, referring to FIG. 6B, the control unit access monitoring function 112 of the control unit 110 receives the I/O command with the remove request from the host OS access monitoring function 105 at operation 620. The control unit access monitoring function 112 searches the control unit access monitoring session table 113 for the input session ID received from the host OS access monitoring function 105 at operation 621. The control unit access monitoring function 105 determines whether the session for the session ID is found in the table 113 at operation 622. If the session is not in the table 113, the control unit access monitoring function 112 of the control unit 110 returns a failure response to the host 100 (e.g., host A) that issued the remove request at operation 623. Otherwise, if the session ID is found in the table 113, the control unit access monitoring function 112 checks the session table 113 entry data for the issuing host 100 to see if the issuing host 100 is an owner of the session at operation 624. If the issuing host 100 is not an owner of the session, the control unit access monitoring function 112 of the control unit 110 returns a failure response to the host 100 at operation 625. Otherwise, if the issuing host 100 is an owner of the session, the control unit access monitoring function 112 removes the session from the control unit access monitoring session table 113 at operation 626. The control unit access monitoring function 112 of the control unit 110 then returns to the host 100 (e.g., host A) with a success response and an indication that the session was removed at operation 627.

Referring again to FIG. 6A, the host OS access monitoring function 105 checks/analyzes the response from the I/O command to remove the session received from the control unit access monitoring function 112 at operation 608. The host OS access monitoring function 105 determines whether the I/O command sent by the host 100 received a success response or failure response from the control unit access monitoring function 112 of control unit 110. If the I/O command failed (i.e., host 100 received a failure response from control unit access monitoring function 112), the host OS access monitoring function 105 returns a failure response to the requestor (e.g., application 103 and/or OS component 102) at operation 610. Otherwise, if the remove request I/O command is a success, the host OS access monitoring function 105 deletes the session entry (corresponding to the session ID) from the host OS access monitoring session table 104 at operation 611, and returns a success response to the requestor at operation 612.

Figure 7A:
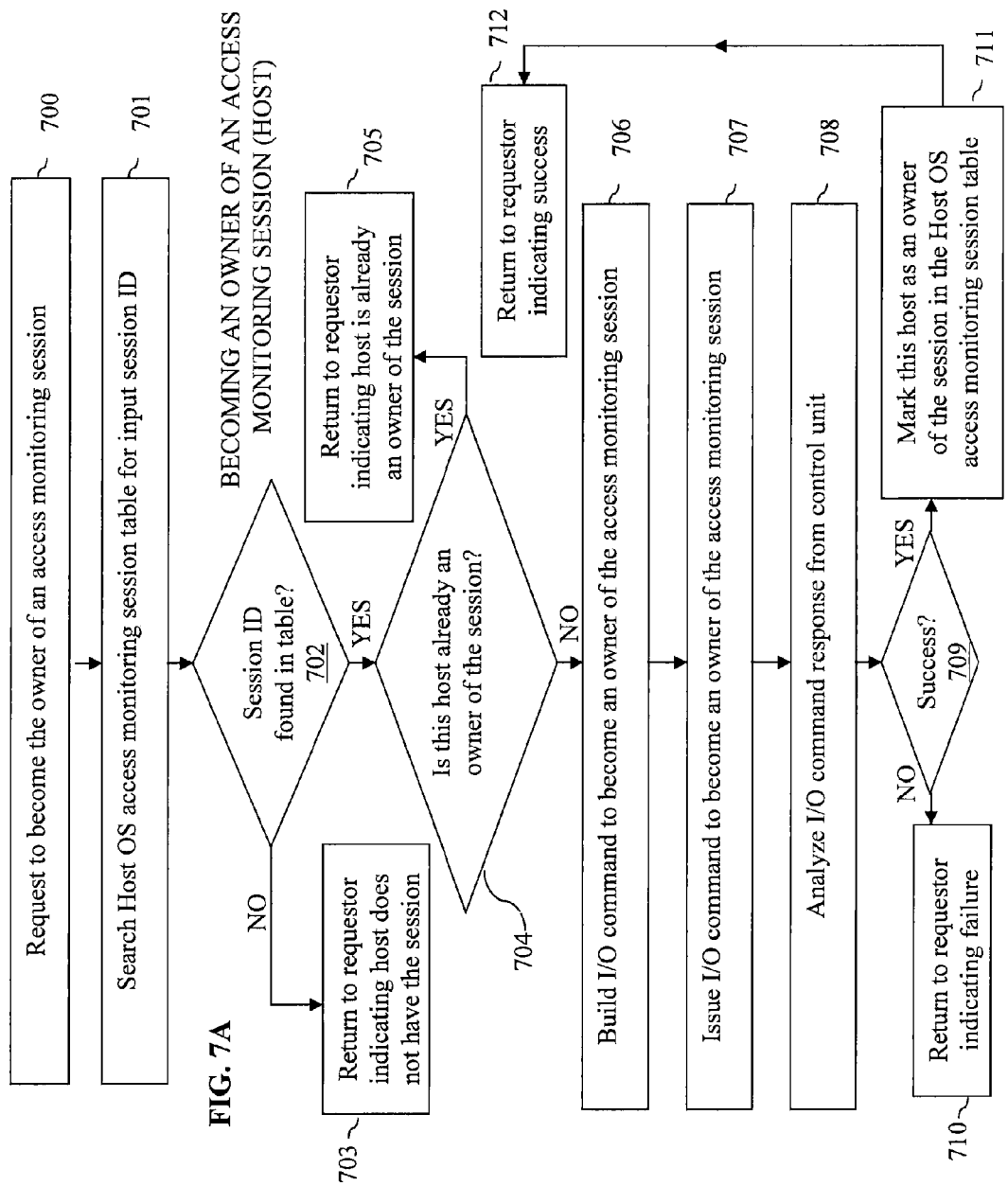
Figure 7B:
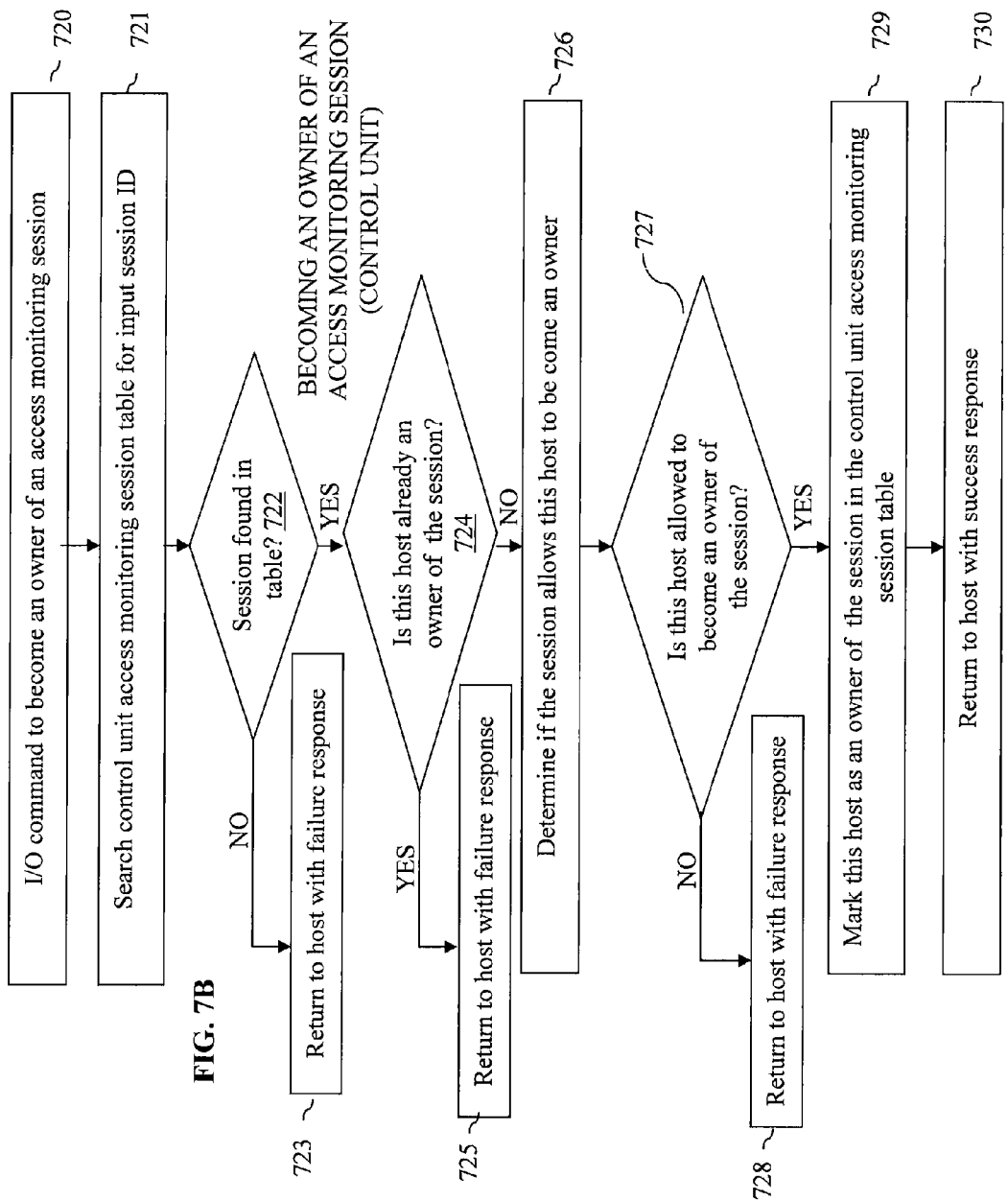

FIGS. 7A and 7B relate to becoming an owner of an access monitoring session in accordance with exemplary embodiments. FIG. 7A is a flow chart illustrating operations for becoming an owner by the host OS monitoring function 105, and FIG. 6B is a flow chart illustrating operations for becoming an owner by the control unit access monitoring function 112 according to exemplary embodiments. Although shown separately for simplicity, note that the flow charts of FIGS. 7A and 7B may be interrelated.

Referring to FIG. 7A, the host OS access monitoring function 105 receives a request to become an owner of an existing access monitoring session from a requestor (e.g., application 103 and/or OS component 102) at operation 700. The request parameters 201 of the owner request include the session ID. The host OS access monitoring function 105 searches the host OS access monitoring session table 104 for the input session ID at operation 701. The host OS access monitoring function 105 determines whether the session ID is found in the table 104 at operation 702. If the session for the session ID is not found in the host OS access monitoring session table 104, the host OS access monitoring function 105 transmits a return to the requestor indicating that this host 100 (e.g., host A) has not joined the session at operation 703. If the session for the session ID is found in the table 104, the host OS access monitoring function 105 checks the table entry of the table 104 to determine if this host 100 already is an owner of the session at operation 704. If this host 100 is an owner, the host OS access monitoring function 105 transmits a return to the requestor indicating that this host 100 is already an owner at operation 705. Otherwise, if this host 100 is not an owner, the host OS access monitoring function 105 builds a special I/O command to pass the request to become an owner to the control unit access monitoring function 112 of control unit 110 at operation 706. The request parameters 201 of the request to become an owner include the session ID. The I/O command is issued from the host OS access monitoring function 105 to a device (e.g., the volumes 114) on the control unit 110 at operation 707.

Referring to FIG. 7B, the control unit access monitoring function 112 of the control unit 110 receives the I/O command with the request to become an owner from the host OS access monitoring function 105 of the host 100 at operation 720. The control unit access monitoring function 112 searches the control unit access monitoring session table 113 for the input session ID at operation 721. If the session is not in the table 113 the control unit access monitoring function 112 of the control unit 110 returns a failure response to the host 100 at operation 723. Otherwise, the control unit access monitoring function 105 checks the session table 113 entry data for the issuing host 100 to determine if the issuing host 100 is already an owner of the session at operation 724. If the issuing host 100 is already an owner of the session for the session ID, the control unit access monitoring function 112 of the control unit 110 returns a failure response to the host 100 at operation 725. Otherwise, if the issuing host 100 is not an owner, the control unit access monitoring function 105 determines from the Ownership type and the current Owner value whether the issuing host 100 is allowed to become an owner of the session at operation 726. Note that the only case where the host is allowed to become an owner is where the Ownership type is "single with alternates" and the issuing host joined as an "alternate". For Ownership type "single", the ownership cannot change. For Ownership types "all joined" and "all attached", the issuing host is already an owner. Additional rules for owning a session could also be defined according to exemplary embodiments. If the issuing host 100 is not allowed to become an owner of the session, the control unit access monitoring function 112 of the control unit 110 returns to the host 100 with a failure response at operation 728. Otherwise, if the issuing host 100 is allowed to become an owner of the session, the control unit access monitoring function 112 updates the session entry in the control unit access monitoring session table 113 to mark the issuing host 100 as an owner and to mark the previous owner as not an owner at operation 729. The control unit access monitoring function 112 of control unit 110 then returns to the host 100 with a success response at operation 730.

Now, referring again to FIG. 7A, the host OS access monitoring function 105 receives and checks the response to the I/O command to become an owner of the session received from the control unit access monitoring function 112 at operation 708. The host OS access monitoring function 105 determines if it received a success or failure to become an owner from the control unit access monitoring function 112 at operation 709. If the I/O command failed (i.e., the control unit access monitoring function 112 transmitted a failure response), the host OS access monitoring function 105 returns a failure response to the requestor at operation 710. Otherwise, if the I/O command is a success (i.e., the control unit access monitoring function 112 transmitted a success response), host OS access monitoring function 105 updates the session entry in the host OS access monitoring session table 104 to mark this host 100 as an owner of the session at operation 711, and returns a success response to the requestor at operation 712.

Note: The request to become an owner could be further generalized to allow the Owner to be changed to any value (such as yes, no, and/or alternate) allowed by the Ownership type. If the Ownership type was "single with alternates", a host with Owner "no" could request to change to be an "alternate". If a host that was the only owner of a session requested a change to not be an owner, the session would be removed.

Figure 8A:
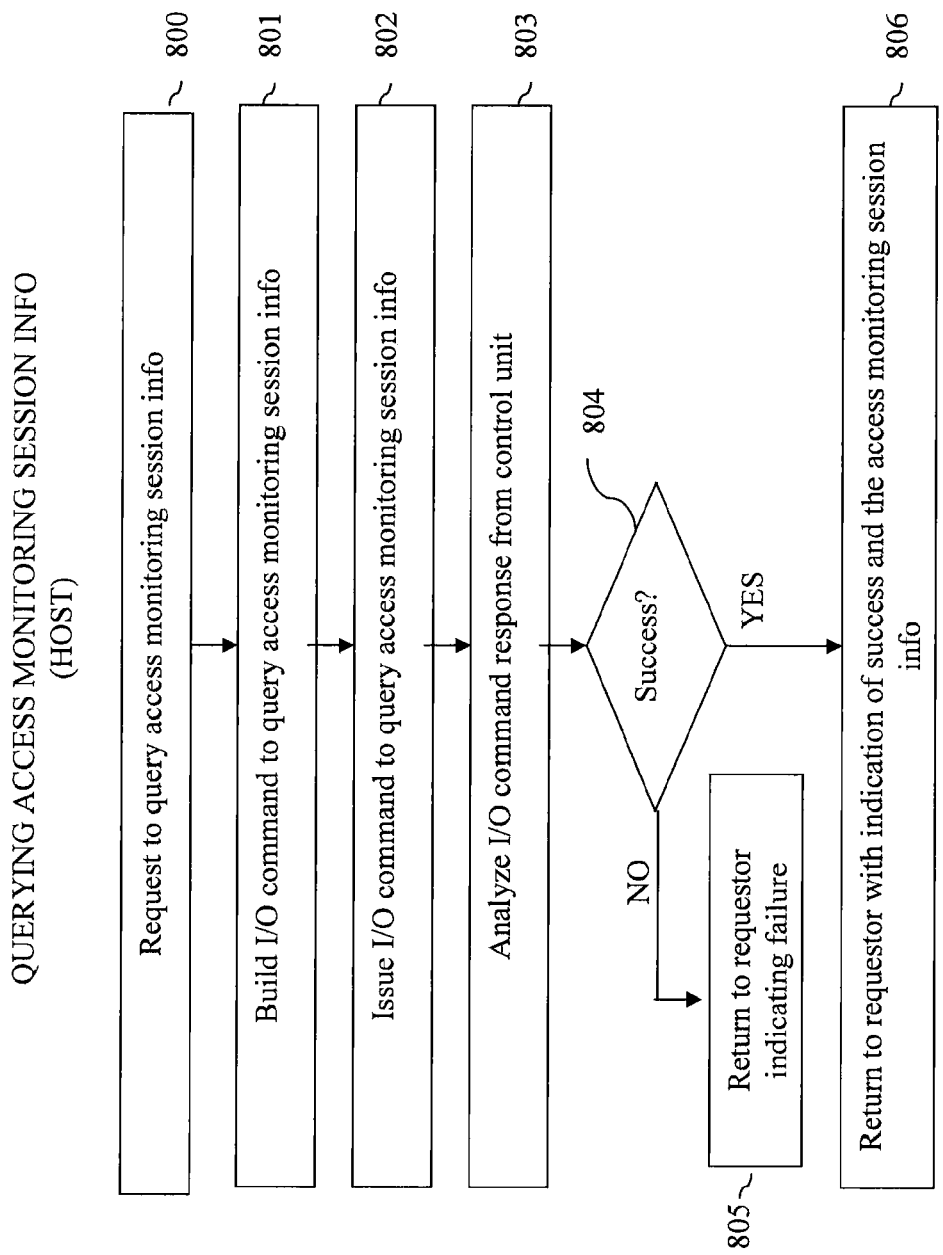
Figure 8B:
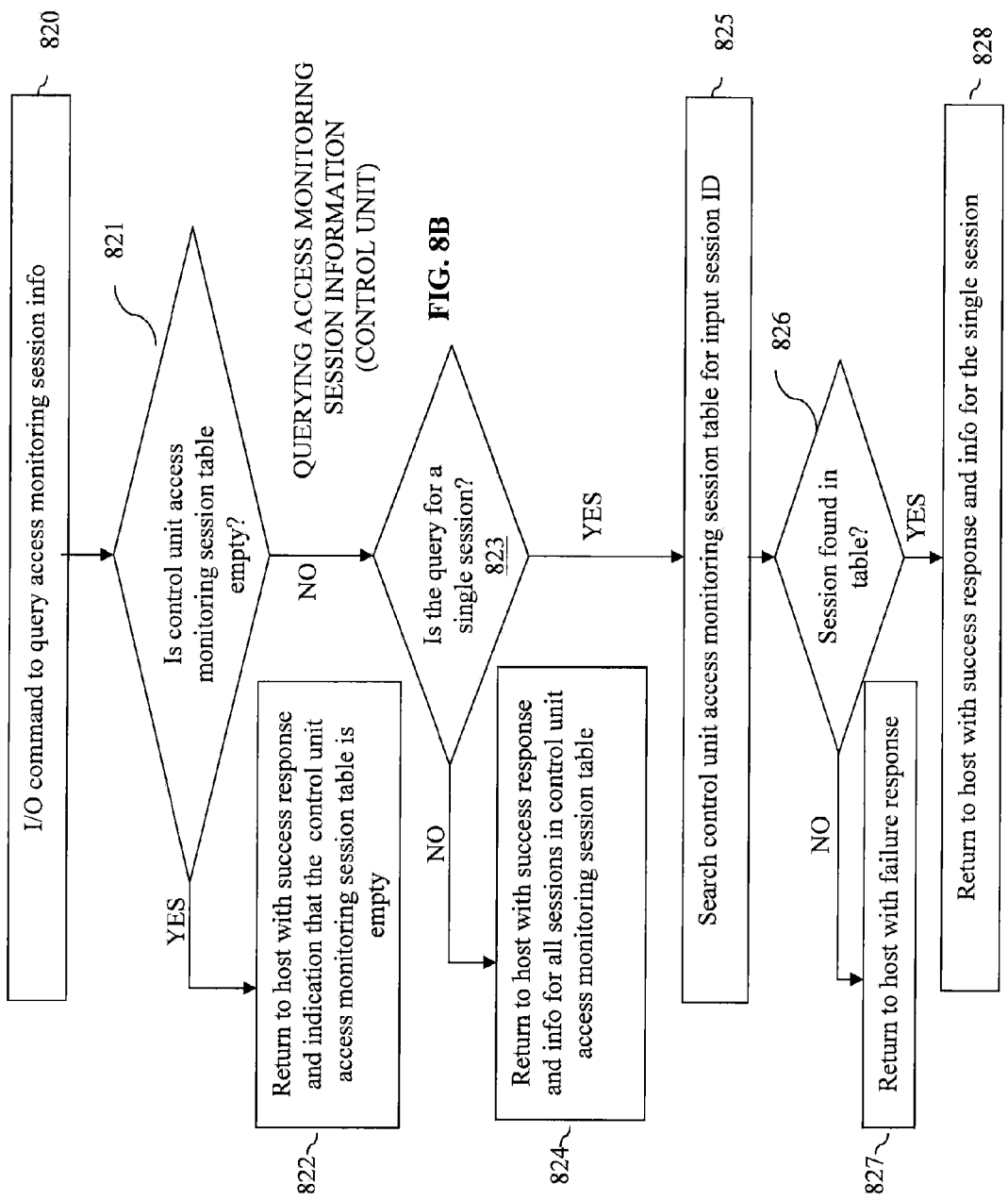

FIGS. 8A and 8B relate to querying access monitoring session information in accordance with exemplary embodiments. FIG. 8A is a flow chart illustrating querying operations of the host OS monitoring function 105, and FIG. 8B is a flow chart illustrating querying operations of the control unit access monitoring function 112 according to exemplary embodiments. Although shown separately for simplicity, note that the flow charts of FIGS. 8A and 8B may be interrelated.

Referring to FIG. 8A, the host OS access monitoring function 105 receives a request to query access monitoring session information from a requestor (such as the application 103 and/or OS component 102) at operation 800. The request parameters 201 of the query request include the Query type and the control unit ID. For Query type "single session", the session ID is also required. (Note that the control unit ID is not required for Query type "single session" if the host OS access monitoring function 105 can determine the control unit ID from the session ID.)

The host OS access monitoring function 105 builds a special I/O command to pass the query request to the control unit access monitoring function 112 of control unit 110 at operation 801. The request parameters 201 include the Query type and, for Query type "singe session", the session ID. The I/O command is issued by the host OS access monitoring function 105 to a device (e.g., volumes 114) on the control unit 110 at operation 802.

Now, referring to FIG. 8B, the control unit access monitoring function 112 of control unit 110 receives the I/O command with the query request from the host OS access monitoring function 105 at operation 820. The control unit access monitoring function 112 checks if the control unit access monitoring session table 113 is empty at operation 821. If the table 113 is empty, the control unit access monitoring function 112 of control unit 110 returns to the host 100 with a success response and an indication that the table is empty at operation 822. If the table 113 is not empty, the control unit access monitoring function 112 checks the Query type to determine if query request is for a "single session" or "all sessions" at operation 823. If the Query type is "all sessions", the control unit access monitoring function 112 of the control unit 110 returns to the host 100 with a success response and the information (e.g., for each row) for all sessions in the control unit access monitoring session table 113 at operation 824. Otherwise, this is a query for a "single session" and the control unit access monitoring function 112 searches the control unit access monitoring session table 113 for the input session ID corresponding to the single session at operation 825. If the session (for the session ID) is not in the table 113, control unit access monitoring function 112 of the control unit 110 returns a failure response to the host at operation 827. Otherwise, if the session (session ID) is found in the table 113, the control unit access monitoring function 112 of the control unit 110 returns to the host 100 with a success response and the information for the requested session (e.g., a particular row) from the control unit access monitoring session table 113 at operation 828.

Now, referring back to FIG. 8A, the host OS access monitoring function 105 receives and checks the response from the I/O command for the query request received from the control unit access monitoring function 112 at operation 803. The host OS access monitoring function 105 determines if the response to the I/O command transmitted from the control unit access monitoring function 112 is a success or failure at operation 804. If the I/O command failed (i.e., the response from the control unit access monitoring function 112 was a failure response), host OS access monitoring function 105 returns a failure response to the requestor (e.g., application 103 and/or OS component 102) at operation 805. Otherwise, (i.e., the response from the control unit access monitoring function 112 was a success response), host OS access monitoring function 105 transmits a return to the requestor indicating success and providing the information for the access monitoring session(s) supplied by the control unit access monitoring function 112 of control unit 110 at operation 806.

The above requests can be used by a program on a host 100 (e.g., OS component 102 and/or application 103) to provide a user interface and/or an API for managing the access monitoring sessions on one or more control units 110.

Further information regarding I/O commands is discussed below. I/O requests from a host system 100 to an external storage controller 110 may or may not access data on storage volumes 114. I/O requests that access data typically start with one or more "permissions" commands (e.g., the Define Extent or Prefix command for IBM zSeries® ECKD DASD). The permissions command(s) specify the type of access allowed (read and/or write) and the range of data blocks that can be accessed. For example, the starting and ending CCHH (cylinder number and head number) for IBM zSeries® ECKD DASD specify which track(s) will be accessed. The permissions command(s) may also be followed by one or more I/O commands that give the control unit 110 information about the data access to be done so the control unit 110 can prepare for the data transfer. These "preparatory" commands may specify more precisely which data block(s) are to be accessed. For example, the Locate Record command for IBM zSeries® ECKD DASD specifies which record(s) on a track will be accessed, such as e.g., the R in a CCHHR data block address. From the permissions (and preparatory) I/O commands, the control unit 110 can determine what data block(s) will be accessed and whether for reads and/or writes before the data access occurs.

When a control unit 110 returns an error response to an I/O request from a host 100, typically some additional data is provided to indicate the reason for the error. This data may be presented along with the error response or retrieved by the host issuing another I/O request (e.g., the sense command, which retrieves the sense data associated with the volume after an error, for IBM zSeries®).

Figure 9A:
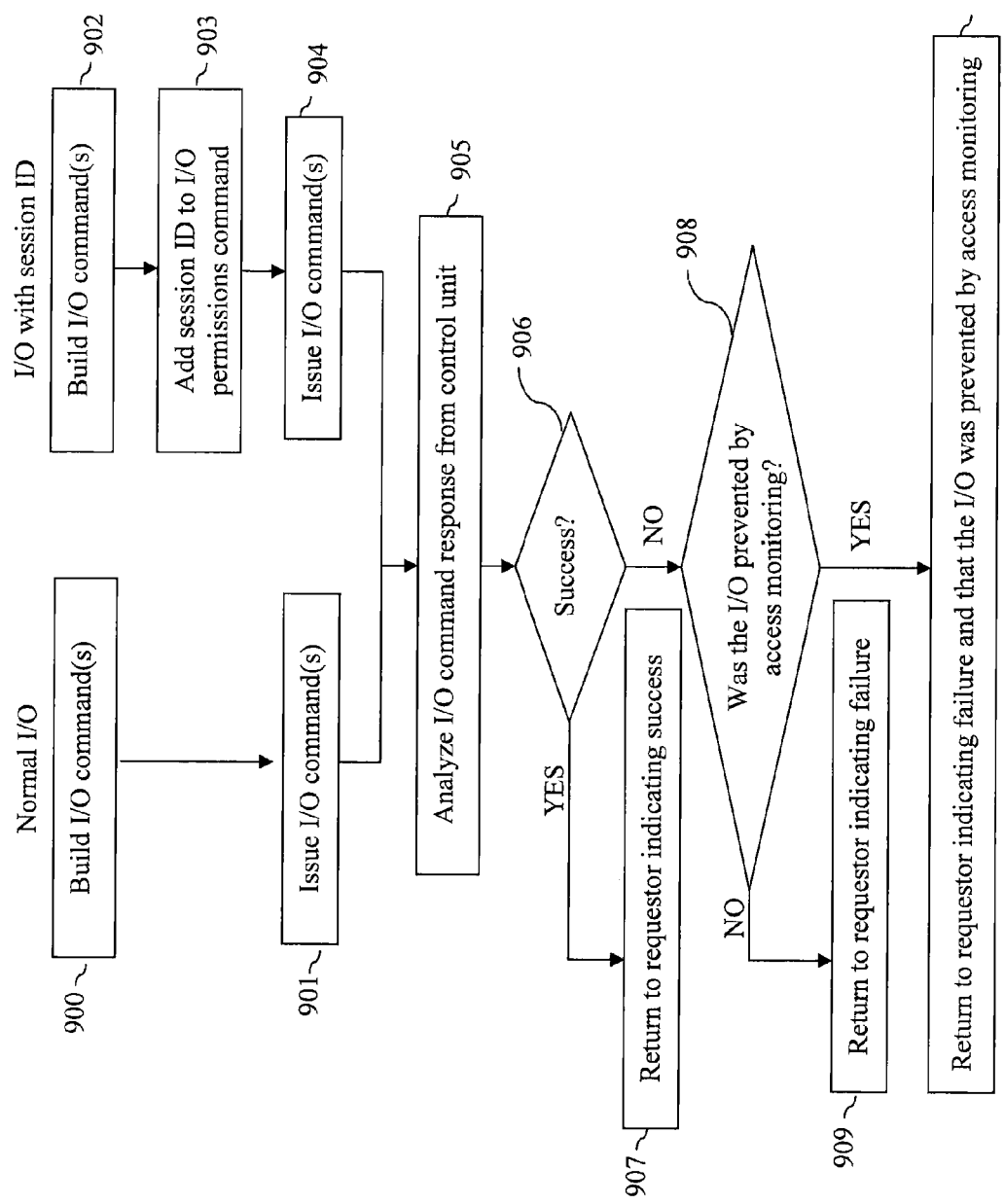
Figure 9C:
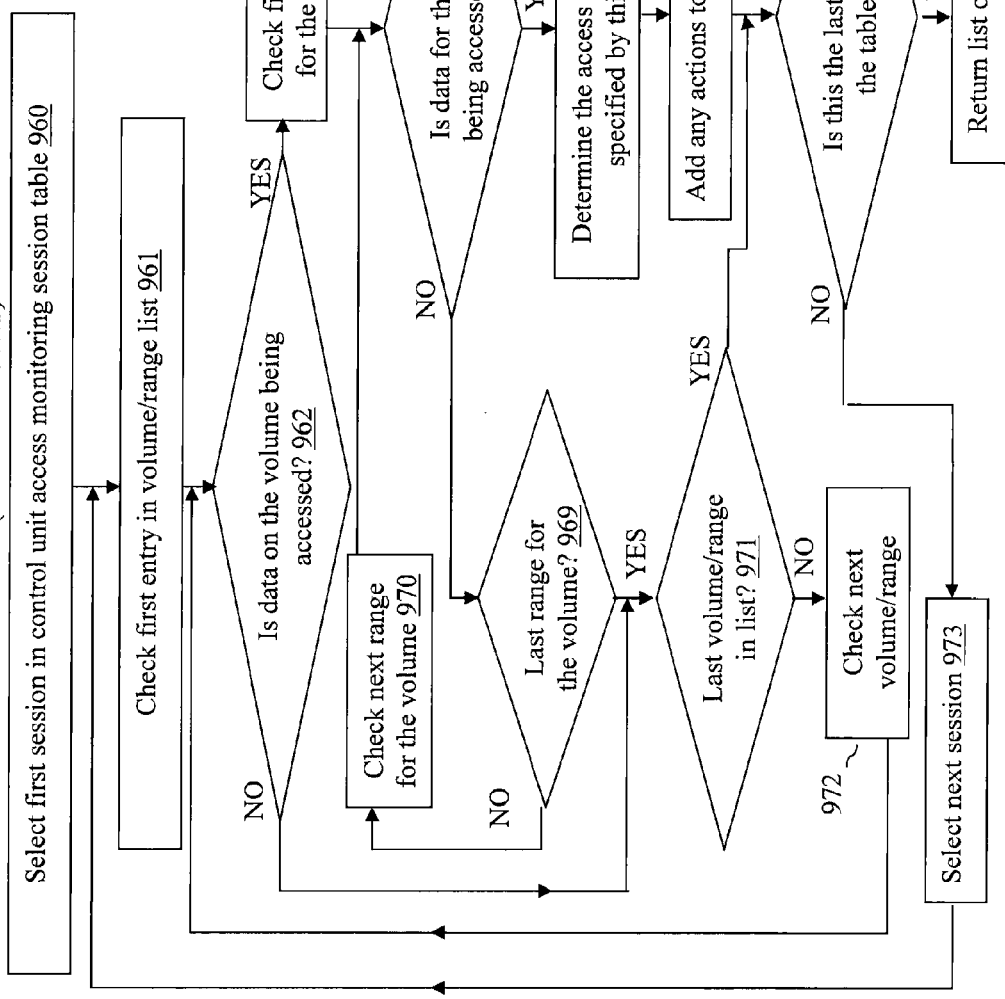
FIGS. 9C and 9D are flow charts illustrating actions related to access monitoring sessions in accordance with exemplary embodiments.
Figure 9D:
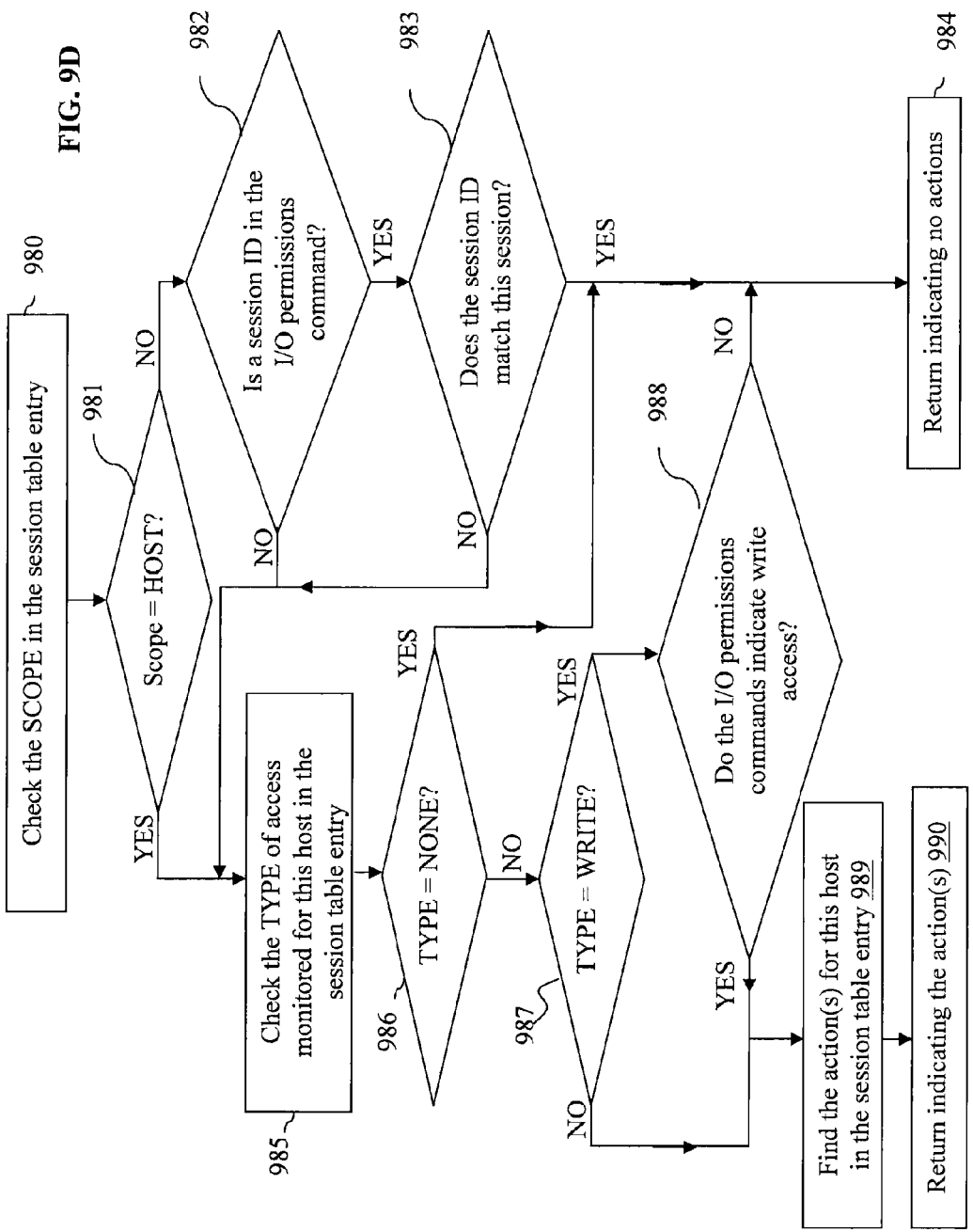

The following describes how a control unit 110 having one or more access monitoring sessions established (e.g., in table 113) can monitor access to the volumes 115 on volumes 114 on the control unit 110, as instructed by those sessions. FIGS. 9A and 9B relate to host I/O requests in accordance with exemplary embodiments. FIG. 9A is a flow chart illustrating host I/O requests operations of the host OS monitoring function 105, and FIG. 9B is a flow chart illustrating host I/O requests operations of the control unit access monitoring function 112 in accordance with exemplary embodiments. FIGS. 9C and 9D relate to determining actions for any data monitored by an access monitoring session (e.g., in table 113) by the control unit access monitoring function 112 of the control unit 110 in accordance with exemplary embodiments. Although shown separately for simplicity, note that the flow charts of FIGS. 9A, 9B, 9C, and 9D may be interrelated.

Referring to FIG. 9A, the host system 100 issues an I/O request to a device (e.g., volume 115 on the volumes 114) on the control unit 110. This can be any of the I/O requests usually issued by the host 100 to a volume 115, such as a file (dataset) update or a database read. The host 100 processes the I/O request in its normal manner; the host OS access monitoring function 105 is not involved in the I/O request. Normally, the I/O commands are built by the host 100 without knowledge of access monitoring sessions at operation 900. For an access monitoring session with request Scope, an authorized program (e.g., application 103 and/or OS component 102) can build an I/O request at operation 902 and can add the session ID in a new portion of a "permissions" command at operation 903. In both cases, the I/O command(s) are then issued by host 100 to a device (e.g., volume 115 on volumes 114) on the control unit 110 at operation 901 and/or 904. The host 100 checks the response (discussed further in FIG. 9B) to the I/O request returned by the control unit 110 at operation 905. If the response from the control unit 110 indicates success, host 100 transmits a return to the requesting program (e.g., the application 103 and/or OS component 102) indicating success at operation 907. For a failure response from the control unit 110, the host 100 checks the error information provided for the error response (e.g., the sense data for IBM zSeries®) to determine if the I/O request was prevented by access monitoring of the control unit access monitoring function 112 at operation 908. If the I/O request was not prevented by access monitoring of the control unit access monitoring function 112, the host 100 transmits a return to the requesting program with a normal failure indication at operation 909. If the I/O request was prevented by the access monitoring of the control unit access monitoring function 112, the host 100 transmits a return to the requesting program indicating failure because the I/O request was prevented by access monitoring of the control unit access monitoring function 112 at operation 910.

Now turning to FIG. 9B, the control unit 110 receives the I/O request from the host 100 (discussed for operations 901 and 904 in FIG. 9A) at operation 920. Besides the normal control unit 110 processing for the I/O request, and before data access occurs, the control unit access monitoring function 112 analyzes the I/O permissions (and preparatory) command(s) to determine the volume(s) 115 (of volumes 114) and data range(s) to be accessed and analyzes the I/O permissions (and preparatory) command(s) to determine whether read and/or write access is to be made at operation 921. (Note that normally an I/O request will only access a single volume. However, there can be cases, such as with data "striped" across volumes, where one I/O request accesses multiple volumes.) The control unit access monitoring function 112 determines if the I/O request accesses data on any volume 115 of the volumes 114 at operation 922. If the I/O request will not access any volumes 115 (and/or if there are no access monitoring sessions), the control unit access monitoring function 112 takes no further action. The I/O request is processed normally by the control unit 110 at operation 928 and the appropriate normal success or failure response is returned from control unit 110 to the host 100 at operation 929. If the volume(s) 115 will be accessed, the control unit access monitoring function 112 determines if any action(s) need to be taken due to data being monitored at operation 923; operation 923 is as further explained in FIGS. 9C and 9D described below.

Referring to FIG. 9C, the control unit access monitoring function 112 selects the first session (e.g., the first row) in the control unit access monitoring session table 113 at operation 960 and the control unit access monitoring function 112 checks the first entry in that session's volume/range list (e.g., the first row in volume/range list 226a) at operation 961. The control unit access monitoring function 112 determines whether data on the volume (e.g., volume 115) is to be accessed at operation 962. If not, the control unit access monitoring function 112 determines if this is the last volume/range in the volume/range list at operation 971. If not, then the next entry (next row), if any, in the volume/range list is selected by the control unit access monitoring function 112 at operation 972. If the I/O request will access data on the volume in operation 962, then the first data range (e.g., the second column in volume/range list 226a) is checked by the control unit access monitoring function 112 at operation 963. The control unit access monitoring function 112 determines if data for the data range (e.g., data range 02500 to 03200 on example volume 5010 in volume/range list 226a) is being accessed at operation 964. If not, the control unit access monitoring function 112 determines if this is the last range for the volume at operation 969. If this is not the last data range for the volume, the control unit access monitoring function 112 checks the next data range (next column) for that same volume in the volume/range list at operation 970. If there are no more data ranges (columns) for that volume in the volume/range list at operation 969, then the control unit access monitoring function 112 determines if this is the last volume/range in the volume/range list at operation 971. If not, the next entry (row), if any, in the volume/range list is checked by the control unit access monitoring function 112 at operation 972 and the control unit access monitoring function proceeds to operation 962. If this is the last volume/range in the volume range list at operation 971, then the control unit access monitoring function 112 determines if this is the last session (e.g., last row) in table 113 at operation 967 (and proceeds as described below in further reference to FIG. 9C).

Back to operation 964, if a data range is found that will be accessed by the I/O request at operation 964, then the actions to be taken for the session are determined by the control unit access monitoring function 112 at operation 965; operation 965 may be further explained in FIG. 9D as described below.

Now referring to FIG. 9D, the control unit access monitoring function 112 checks the Scope in the session table entry in the table 113 at operation 980. The control unit access monitoring function 112 determines if the request Scope is the value "host" or "request" at operation 981. If this is request Scope (i.e., the Scope is the value "request" not "Host"), then the control unit access monitoring function 112 checks for a session ID in the I/O permissions command(s) at operation 982. If there is a session ID, the session ID from the I/O command is compared with the session ID in the session table entry of table 113 in operation 983. If the session IDs match, the control unit access monitoring function 112 determines that the I/O request is allowed by this session and no actions are indicated for this session at operation 984. If the session IDs do not match at operation 983 or if there is no session ID in the I/O command at operation 982, then the actions are determined as for host Scope by the control unit access monitoring function 112. If the request is host Scope, the control unit access monitoring function 112 checks the Type of access being monitored for the issuing host 100 in the session table entry of the table 113 at operation 985. If the control unit access monitoring function 112 determines that the Type is none at operation 986, any data access is allowed by the control unit access monitoring function 112, so the control unit access monitoring function 112 indicates no actions for this session at operation 984. If the Type is not "none" and the control unit access monitoring function 112 determines the Type is "write" at operation 987, the control unit access monitoring function 112 determines if the I/O permissions commands indicate write access at operation 988. If the I/O permissions (and preparatory) command(s) show that writes will not be done, then no actions are indicated for this session at operation 984. If writes will be done at operation 988, then the action(s) for this host 100 are found in the session table entry of table 113 by the control unit access monitoring function 112 at operation 989 and the control unit access monitoring function 112 indicates the actions for this session (for further processing) at operation 990. If the Type is not "write" at operation 987, then the Type is "all", meaning no data access is allowed by the control unit access monitoring function 112, so the action(s) for this host 100 are found at operation 989 and returned at operation 990. Referring again to FIG. 9C, any actions determined (and/or returned in FIG. 9D) for this session are saved in a list by the control unit access monitoring function 112 at operation 966. The control unit access monitoring function 112 determines if this is the last session (e.g., last row) in the table 113 at operation 967. If this is not the last session in the control unit access monitoring session table 113, the next session is selected by the control unit access monitoring function 112 at operation 973 and the process continues by the control unit access monitoring function 112 starting with a check of the first entry in the volume/range list of the next session at operation 961. If this is the last session in the table 113, the control unit access monitoring function 112 returns the list of actions at operation 968.

Referring again to FIG. 9B, the list of actions determined by the control unit access monitoring function 112 in operation 923 (as discussed with reference to FIGS. 9C and 9D) can include notify, prevent, both and/or neither (e.g., a null list). The control unit access monitoring function 112 determines if the list of actions includes a notify action at operation 924. If the notify action was specified in the list of actions, the control unit access monitoring function 112 schedules an asynchronous notification of the "illegal" access (and/or access attempt) to the host OS access monitoring function 105 of host 100 that is the owner of the session at operation 925. The host OS access monitoring function 105 then calls the notification exit of the requestor (e.g., application 103 and/or OS component 102), providing the exit with the information about the "illegal" access. As an example on zSeries®, notification by the host OS access monitoring function 105 can be done in a two step process: first the control unit 110 presents unsolicited attention status to the host 100, and then the host 100 issues a command to read the status from the control unit 110. If the status includes information about "illegal" access, that information is sent to the host OS access monitoring function 105. Additionally, an option on the Notify action could be provided to have multiple hosts 100 be notified by the control unit access monitoring function 112 of the control unit 110 about the "illegal" access (and/or attempt). Following the notify action processing of operation 925, or if the list does not include a notify action, the control unit access monitoring function 112 determines if the list of actions includes a prevent action at operation 926. If the prevent action was specified in the list of actions, the control unit access monitoring function 112 of control unit 110 returns to the host 100 with a failure response that indicates the I/O request was prevented by access monitoring at operation 927. If the prevent action was not specified, no further action is taken for this I/O request by the control unit access monitoring function 112. The I/O request is processed normally by the control unit access monitoring function 112 at operation 928 and the appropriate normal success or failure response is returned to the host 100 by the control unit access monitoring function 112 at operation 929.

Further regarding the Host I/O request, when an I/O request is prevented by access monitoring (of the control unit access monitoring function 112), the host OS 101 (possibly by calling the access monitoring function 105) can issue a special I/O error message.

Additionally, in accordance with exemplary embodiments, the overhead of the checking done by the control unit access monitoring function 112 can be reduced in several ways. First, each volume 115 of the volumes 114 can have an indicator 125 of whether any data on the volumes 115 is monitored. The indicator can be set on (e.g., by the control unit access monitoring function 112) for all affected volumes 115 when a session is established at the control unit 110. This indicator 125 can be set off (e.g., by the control unit access monitoring function 112) when the last session affecting a volume 115 is removed. For example, the indicator can be a flag set (i.e., set to on) in memory of the control unit 110 for each volume 115 having data monitored in the table 113. The flag would not be set (i.e., set to off) by the control unit access monitoring function 112 for any volume 115 not having data monitored in table 113. This indicator 125 can then be checked when the check for the I/O request accessing any volume 115 is made by the control unit access monitoring function 112 (e.g., in operation 922 in FIG. 9B). If the I/O request accesses data on a particular volume 115, but that volume 115 has no data being monitored, the NO path (branching from operation 922 in FIG. 9B) can be taken by the control unit access monitoring function 112. This (use of indicator 125) can reduce overhead for I/O requests to data that is not monitored in table 113 by the control unit access monitoring function 112.

Second, each group of data blocks (e.g., a track and/or cylinder for IBM zSeries® ECKD DASD) can have an indicator 126 of whether any data is monitored. These indicators 126 can be set and checked the same as for the volume-level indicator above (the volume indicator can be checked first) by the control unit access monitoring function 112. For example, for each data range a flag can be set to on as an indicator 126 that each data range is be monitored, and a flag can be set to off for each data range not being monitored by the control unit access monitoring function 112.

Third, if the control unit access monitoring session table 113 contains many entries, the overhead to locate the session(s) monitoring data on a volume (e.g., volume 115) can be reduced by (the control unit access monitoring function 112) keeping a list 127 (for each volume 115) of the session IDs monitoring data on that volume 115. When selecting sessions in the table 113 (in operation 960 in FIG. 9C) only those session IDs in the list 127 for the volume(s) being accessed by the I/O request can be picked by the control unit access monitoring function 112. In other words, the control unit access monitoring function 112 maintains a (separate) list 127 of sessions (session IDs) for each individual volume 115.

Figure 10B:
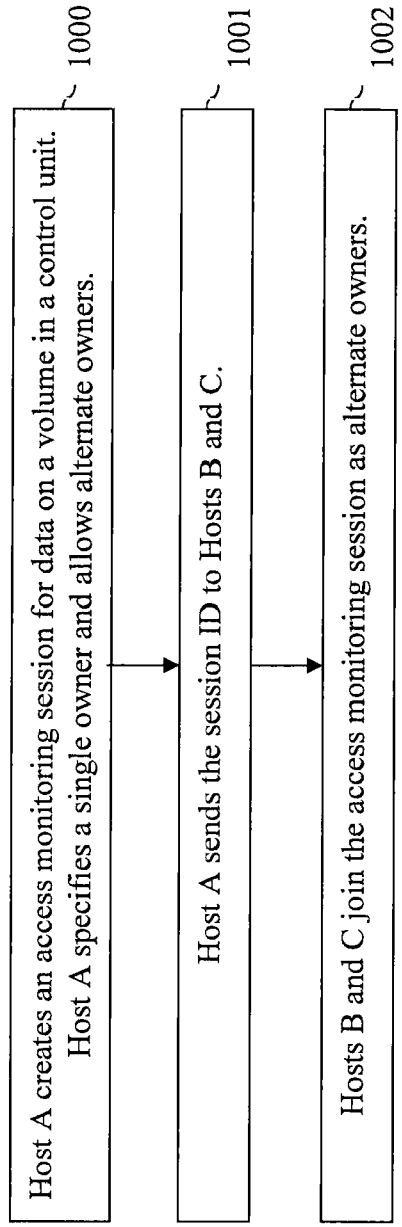

FIG. 10A illustrates an example of coordinating with multiple host systems 100 in accordance with exemplary embodiments. FIG. 10A omits some of the elements of FIG. 1, so as not to obscure FIG. 10A, but it is understood that the omitted elements are (or may be) included in FIG. 10A. Referring to FIG. 10A, a computing system may consist of multiple host systems "clustered" together and sharing access to data on external storage controller(s) 110 (also referred to as the control unit). I/O connections 107 from the host systems 100, host A, host B, and host C are made through the optional switch 106 to the control unit 110 containing volume(s) 115. The host systems 100 may inter-communicate using some clustering technology transport mechanism such as, e.g., a coupling facility 1013 in IBM zSeries®. These clustered host systems 100 can share an access monitoring session in table 113. Optionally, these host systems 100 can set up the session to enable a "takeover" of ownership of the session if the owning session fails (e.g., host A fails). An example for illustrative purposes of such a set up and takeover is described below with reference to FIG. 10B.

Referring to FIG. 10B, FIG. 10B illustrates coordinating an access monitoring session with multiple host systems setting up a monitoring session in accordance with exemplary embodiments. Host A creates an access monitoring session to monitor certain data on a volume 115 (as discussed herein) in the control unit 110 and the parameters 201 for the create request specify Ownership as "single with alternates" at operation 1000. After the session is established, host A sends the session ID and the control unit ID to host B and host C at operation 1001. Host B and host C utilize the session ID and control unit ID to join the session, specifying Owner "alternate" in the Join request parameters at operation 1002. Note: If the control unit globally unique identifier is included in the session ID sent from host A, host B and host C can determine the control unit 110 (out of numerous other control units 110) on which the session was created, and host A does not need to send the control unit ID. After the join request by hosts B and C, host A is now the owner of the session and host B and host C are alternate owners.

Figure 10C:
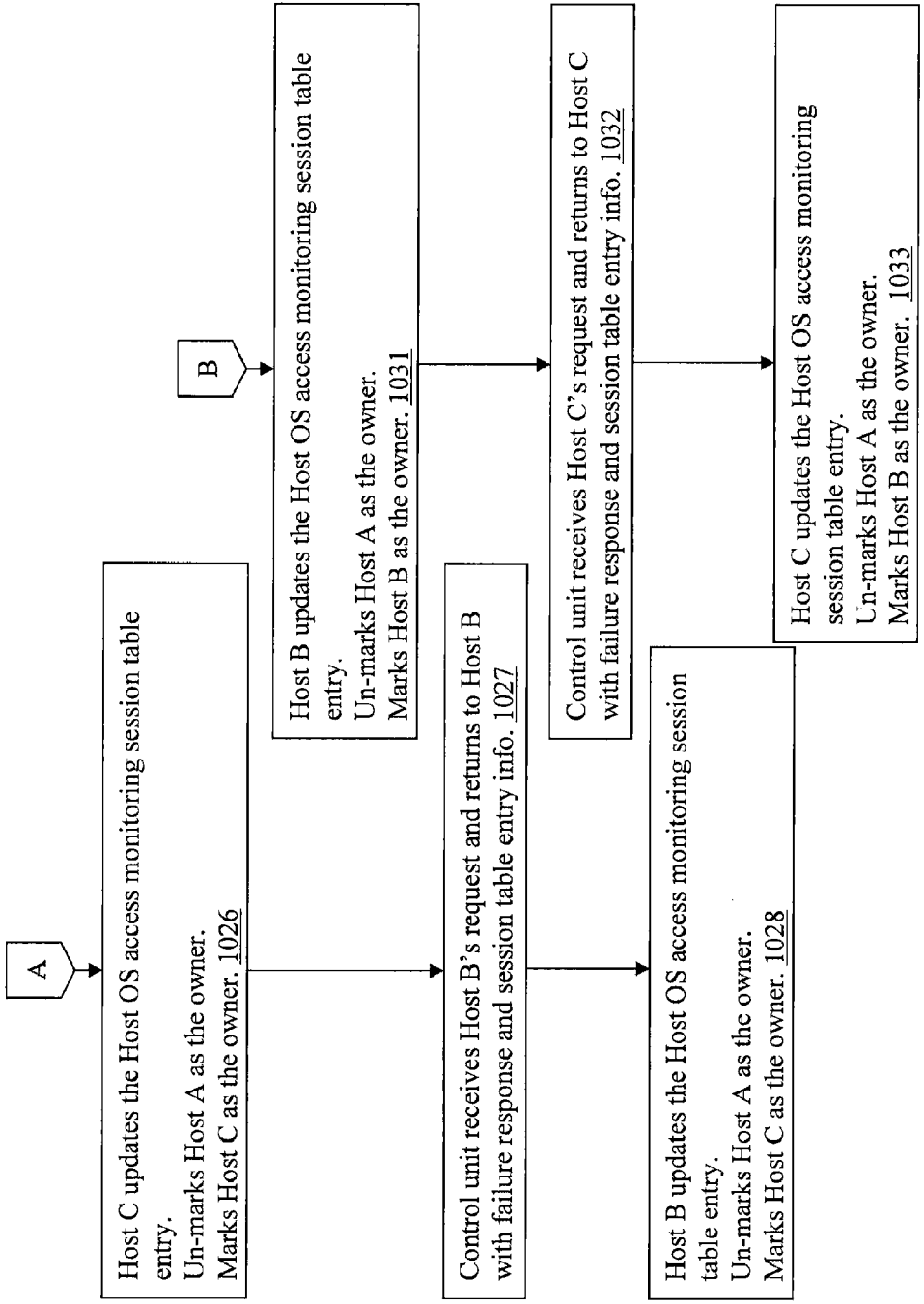

Now, referring to FIG. 10C, FIG. 10C illustrates coordinating an access monitoring session with multiple host systems 100 and "takeover" of an access monitoring session when the owning host (e.g., host A) fails in accordance with exemplary embodiments. For this example, assume that host A fails at operation 1020. Via clustering technology (such as z/OS® XCF in IBM zSeries®) of the coupling facility 1013, host B and host C detect that host A has failed at operation 1021. Being configured to maintain the session, both host B and host C issue requests to become the owner of the session at operation 1022. This processes as a "race" condition by the control unit 110, and whichever host's request is received first by the control unit 110 is the host request that is honored by the control unit 110. That host 100 (e.g., either host B and/or host C) is marked as the owner in the control unit access monitoring session table entry of table 113 for the session, and host A is marked as not the owner in operations 1024 or 1029. The other host 100 not marked as owner remains as an alternate owner. The control unit 110 returns a success response, and the updated session table entry information, to the host 100 whose request was processed at operation 1025 or 1030. The host 100 whose request was processed successfully updates its host OS access monitoring session table entry in table 104 for the session (using the session information returned by the control unit 110), marking itself as the owner and host A as not the owner in operation 1026 or 1031. The control unit 110 receives the host's request that arrived second and returns to that (second) host 100 with a failure response and the updated information for the session table entry of table 113 at operation 1027 or 1032. The host 100 whose request was not processed by the control unit 110 updates its host OS access monitoring session table entry in table 104 for the session (using the session information returned by the control unit 110), marking the host 100 whose request was successful as the owner and host A as not the owner at operation 1028 or 1033. Host A is now not the session owner. The host 100 (e.g., host B or vice versa) whose request was processed is the owner and the other host 100 (e.g., host C or vice versa) remains an alternate.

FIG. 11A illustrates an example of how an access monitoring session can be used in the IBM z/OS® operating system to protect the Volume Table of Contents (VTOC) from accidental corruption in accordance with exemplary embodiments. As mentioned above with reference to FIG. 10A, some elements from FIG. 1 may be omitted in FIG. 11A so as not to obscure the figure, but it is understood that the omitted elements are (may be) included in FIG. 11A. Referring to FIG. 11A, host systems 100, host A, host B, and host C have I/O connections 107 through the switch 106 to the control unit 110. The control unit 110 has a volume 115, which includes a VTOC 1107.

Figure 11B:
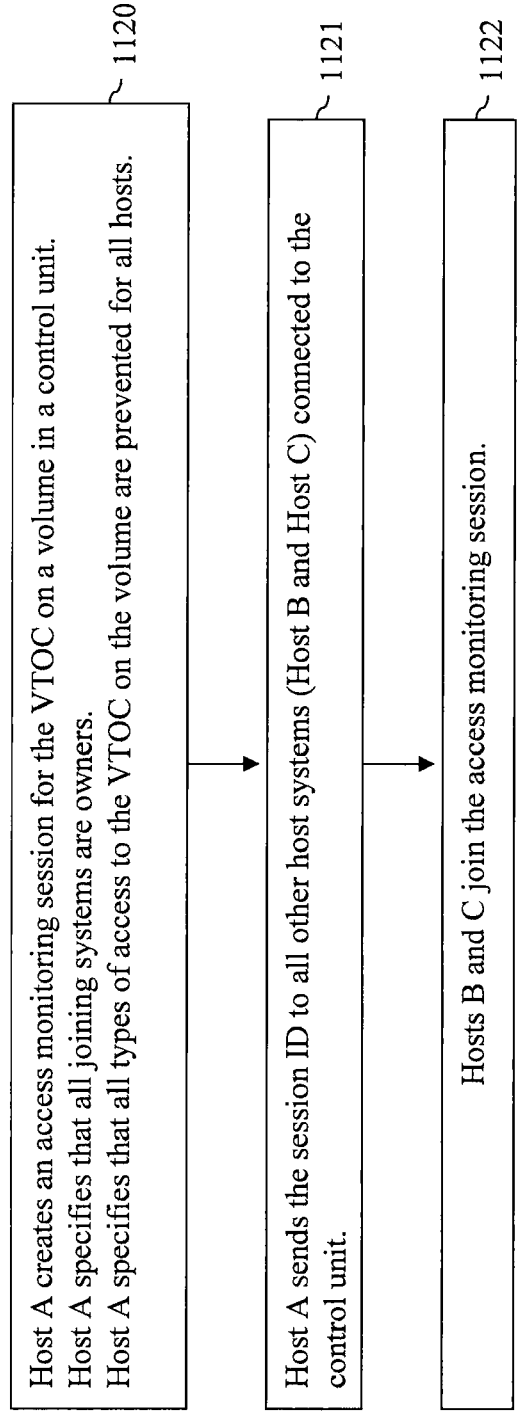

Referring to FIG. 11B, FIG. 11B illustrates an example of protecting the VTOC 1107 using an access monitoring session shared with multiple host systems 100 setting up the monitoring session in accordance with exemplary embodiments. Host A creates an access monitoring session for the volume 115 with a data range to cover the VTOC 1107 at operation 1120. The Scope is "request", the Ownership is "all joined", for this host A and for all other hosts B and C the Type is "all" and the Action is "prevent". No host system 100 can read or write to the VTOC on the volume without including the session ID in the I/O permissions command. Host A sends the session ID to all the other host systems (host B and host C) that have an I/O connection 107 to the control unit 110 at operation 1121. The other hosts (host B and host C) join the session at operation 1122. All hosts 100 are now owners of the session because the Ownership is "all joined".

FIG. 11C illustrates an example of protecting the VTOC 1107 using an access monitoring session shared with multiple host systems 100 having host I/O commands with the session ID in accordance with exemplary embodiments. As an example, assume an OS component 102 on host B needs to update the VTOC 1107 on the volume 115. The OS component 102 builds I/O commands to write to the VTOC 1107 at operation 1130. The OS component 102 adds the session ID to the I/O permissions command at operation 1131. Host B issues the I/O commands to write to the VTOC 1107 on the volume 115 at operation 1132. The control unit 110 grants the I/O commands write access to the VTOC 1107 on the volume 115 because the I/O permissions command includes the matching session ID at operation 1133.

FIG. 11D illustrates an example of protecting the VTOC 1107 using an access monitoring session shared with multiple host systems 100 having host I/O commands without the session ID in accordance with exemplary embodiments. As an example, assume an authorized application program 103 on host A intends to write data to a file 1110 on the volume 115. Due to some error (e.g., a logic error in the program or a storage overlay of an I/O control structure), the I/O commands are built incorrectly and will write to the VTOC 1107 on the volume 115 instead of the intended file 1110 on the volume 115 at operation 1140.

After the application program 103 builds the I/O commands incorrectly, the host A 100 issues the incorrect I/O commands that will write to the VTOC 1107 on the volume 115 (instead of the file 1110) at operation 1141. Because the I/O permissions command does not contain the matching session ID (to match the session ID for the VTOC 1107 in table 113), the control unit 110 does not allow the I/O commands to write to the VTOC 1107, and instead returns an error response to host A at operation 1142. The accidental corruption of the VTOC 1107 on the volume is avoided by the control unit 110 (e.g., the control unit access monitoring function 112 as discussed herein).

Further, if the control unit 110 detects that a host 100 (e.g. host A) that is an owner of a session has failed, and/or that all I/O connections to that host 100 have failed, the control unit access monitoring function 112 can update the control unit access monitoring session table entry for that (particular) session in table 113 as if that host 100 (e.g., host A) had issued a leave request. With multiple host systems 100 coordinating a session, the control unit 110 may also be configured to delay taking the "leave" action for a sufficient (predefined) period of time to allow for host takeover of the session to occur. Optionally, before taking the "leave" action for the failed host 100, the control unit access monitoring function 112 can choose another host 100, if any, that is an alternate owner of the session, make that host 100 the new owner of the session, and notify all hosts 100 that have joined the session of the change in ownership.

Figure 12:
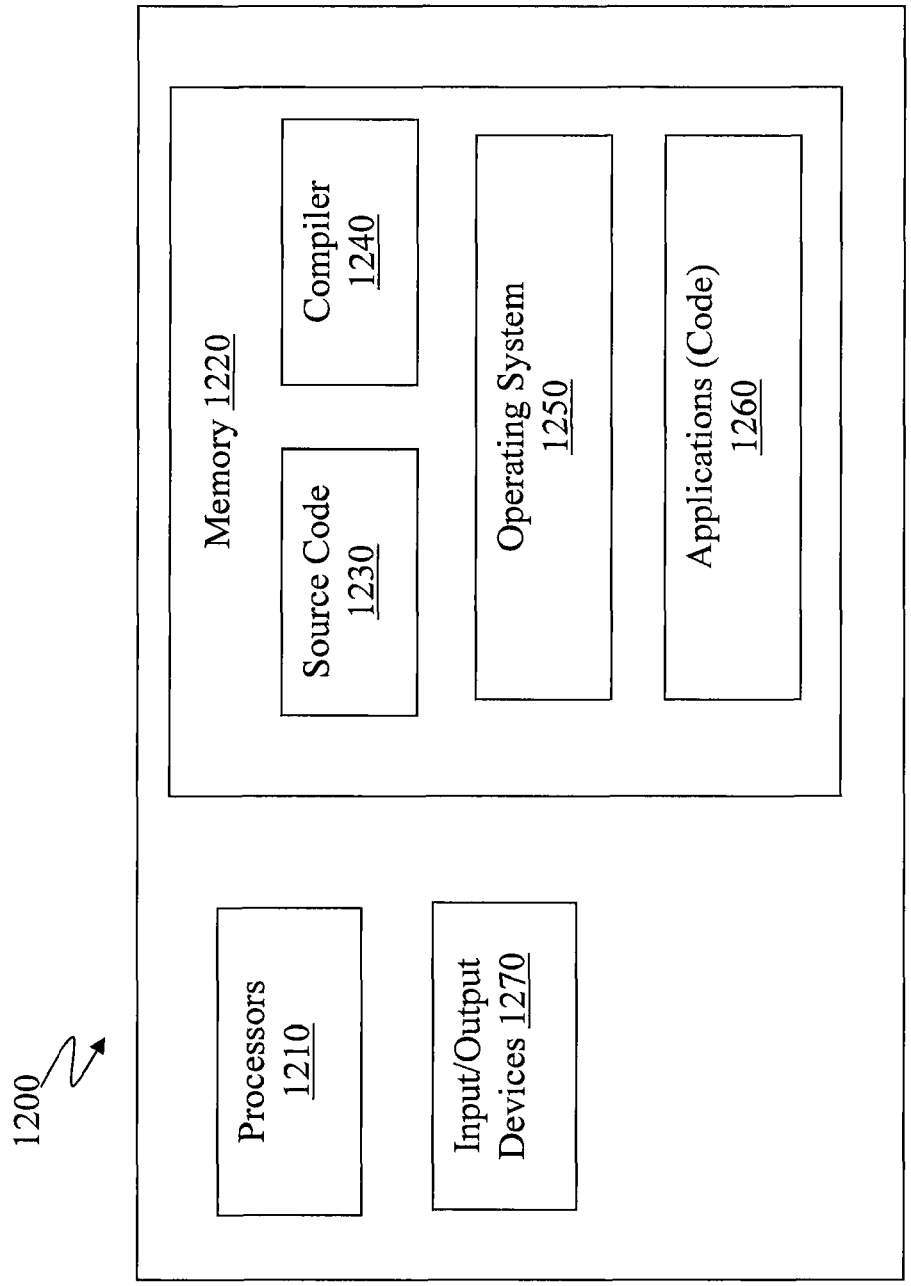
FIG. 12 illustrates an example of a computer having capabilities, which may be included in exemplary embodiments.

FIG. 12 illustrates an example of a computer 1200 having capabilities, which may be included in exemplary embodiments. Various methods, procedures, modules, flow diagrams, tables, and techniques discussed herein may also incorporate and/or utilize the capabilities of the computer 1200. Moreover, capabilities of the computer 1200 may be utilized to implement features of exemplary embodiments discussed herein. One or more of the capabilities of the computer 1200 may implement and/or complement any element discussed herein, such as the hosts 100, the control unit 110, etc.

Generally, in terms of hardware architecture, the computer 1200 may include one or more processors 1210, computer readable storage memory 1220, and one or more input and/or output (I/O) devices 1270 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components. The processor 1210 is a hardware device for executing software that can be stored in the memory 1220. The processor 1210 can be virtually any custom made or commercially available processor, a central processing unit (CPU), a data signal processor (DSP), or an auxiliary processor among several processors associated with the computer 1200, and the processor 1210 may be a semiconductor based microprocessor (in the form of a microchip) or a macroprocessor. The computer readable memory 1220 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 1220 may incorporate electronic, magnetic, optical, and/or other types of storage media. Note that the memory 1220 can have a distributed architecture, where various components are situated remote from one another, but can be accessed by the processor 1210.

The software in the computer readable memory 1220 may include one or more separate programs, each of which comprises an ordered listing of executable instructions for implementing logical functions. The software in the memory 1220 includes a suitable operating system (OS) 1250, compiler 1240, source code 1230, and one or more applications 1260 of the exemplary embodiments. As illustrated, the application 1260 comprises numerous functional components for implementing the features, processes, methods, functions, and operations of the exemplary embodiments. The application 1260 of the computer 1200 may represent numerous applications, agents, software components, modules, interfaces, controllers, etc., as discussed herein but the application 1260 is not meant to be a limitation. The operating system 1250 may control the execution of other computer programs, and provides scheduling, input-output control, file and data management, memory management, and communication control and related services. The application(s) 1260 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction. Further, the application 1260 may be a source program, executable program (object code), script, or any other entity comprising a set of instructions to be performed. When a source program, then the program is usually translated via a compiler (such as the compiler 1240), assembler, interpreter, or the like, which may or may not be included within the memory 1220, so as to operate properly in connection with the OS 1250. Furthermore, the application 1260 can be written as (a) an object oriented programming language, which has classes of data and methods, or (b) a procedure programming language, which has routines, subroutines, and/or functions.

The I/O devices 1270 may include input devices (or peripherals) such as, for example but not limited to, a mouse, keyboard, scanner, microphone, camera, etc. Furthermore, the I/O devices 1270 may also include output devices (or peripherals), for example but not limited to, a printer, display, etc. Finally, the I/O devices 1270 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1270 also include components for communicating over various networks, such as the Internet or an intranet. The I/O devices 1270 may be connected to and/or communicate with the processor 1210 utilizing Bluetooth connections and cables (via, e.g., Universal Serial Bus (USB) ports, serial ports, parallel ports, FireWire, HDMI (High-Definition Multimedia Interface), etc.).

When the computer 1200 is in operation, the processor 1210 is configured to execute software stored within the memory 1220, to communicate data to and from the memory 1220, and to generally control operations of the computer 1200 pursuant to the software. The application 1260 and the OS 1250 are read, in whole or in part, by the processor 1210, perhaps buffered within the processor 1210, and then executed.

When the application 1260 is implemented in software it should be noted that the application 1260 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method. The application 1260 can be embodied in any computer-readable medium 1220 for use by or in connection with an instruction execution system, apparatus, server, or device, such as a computer-based system, processor-containing system, or other system that can fetch the instructions from the instruction execution system, apparatus, or device and execute the instructions. In exemplary embodiments, where the application 1260 is implemented in hardware, the application 1260 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Further, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for maintaining data integrity of a storage device, comprising:
   receiving, by a control unit comprising a processor, a request from a host system to create an access monitoring session for a data range on a volume of the storage device;
   determining a session identification (ID) for the access monitoring session for the data range on the volume;
   creating an entry in an access monitoring session table for the session ID, wherein the entry adds the access monitoring session with the session ID for the data range on the volume to the access monitoring session table;
   wherein request parameters are included in the request from the host system to create the access monitoring session, the request parameters denote access to the data range on the volume for the session ID and the request parameters are stored in the access monitoring session table;
   controlling access to the data range on the volume for the session ID based on the request parameters stored in the access monitoring session table;
   wherein the request parameters, included in the request from the host system that is requesting creation of the access monitoring session, comprise an ownership type, ownership types comprising single, single with alternates, all joined, and all attached;

in response to receiving a request to leave the access monitoring session from a host system, searching by a control unit for the session ID in the access monitoring session table;
failing the request to leave when the session ID is not found in the access monitoring session table;
when the session ID is found in the access monitoring session table, removing the access monitoring session from the access monitoring session table: when the host system is a last host system in the access monitoring session and when the host system is a last owner of the access monitoring session;
when the session ID is found in the access monitoring session table, resetting to default parameters for the host system when the host system is not the last host system in the access monitoring session and when the host system is not the last owner of the access monitoring session; and
when the control unit does not permit the last host system to leave the access monitoring session, requiring the last host system to issue a remove request.

2. The method of claim 1, wherein the request parameters transmitted to a control unit from a host system comprise: a function, the session ID, a control unit identification (ID), a notify exit address, a query type, a scope, a type for the host system, a type for other host systems, actions for the host system, actions for all other hosts, an owner, the volume, and the data range.

3. The method of claim 1, further comprising in response to receiving a request to join the access monitoring session from a host system, determining by a control unit whether to allow the request to join the access monitoring session based on the entry in the access monitoring session table.

4. The method of claim 1, further comprising in response to receiving a request from a host system to become an owner of the access monitoring session with the session ID, determining by a control unit whether to allow the request to become an owner of the access monitoring session based on an ownership type in the entry in the access monitoring session table;
wherein if the session ID is found in the access monitoring session table and if the host system is not the owner of the access monitoring session, the control unit allows the host system to become the owner of the access monitoring session.

5. The method of claim 1, further comprising in response to receiving a request to query the access monitoring session with the session ID, returning by a control unit a success response with access monitoring session information or a failure response based on whether the session ID is found in the access monitoring session table.

6. The method of claim 1, further comprising in response to receiving a request from a host system to remove the access monitoring session with the session ID, removing by a control unit the access monitoring session if the session ID is found in the host system and if the host system is an owner of the access monitoring session.

7. The method of claim 1, further comprising controlling actions to the data range on the volume for a plurality of host systems, wherein controlling actions to the data range on the volume comprise at least one of notify and prevent, based on the entry in the access monitoring session table.

8. The method of claim 1, further comprising controlling access to the data range on the volume for the session ID based on type for host system and type for other host systems comprising at least one of none, write, and all.

9. The method of claim 1, further comprising in response to receiving an I/O request with the session ID from a host system to access the data range on the volume whose access is controlled by the access monitoring session with a value request scope and in response to determining that the session ID matches in the access monitoring session table the session ID of the session controlling access to the data range on the volume, allowing access for the I/O request with no restrictive actions for the host system; and
in response to receiving the I/O request with no session ID from the host system, or in response to receiving the I/O request with the session ID from the host system and determining that the session ID does not match in the access monitoring session table the session ID of the session controlling access to the data range on the volume, determining if there are restrictive actions for the I/O request;
wherein determining if there are restrictive actions is based on checking the request parameters in the access monitoring session table for the host system for the session controlling access to the data range on the volume.

10. The method of claim 1, further comprising in response to receiving an I/O request from a host system to access the data range on the volume whose access is controlled by the access monitoring session with a value host scope, determining if there are restrictive actions for the I/O request;
wherein determining if there are restrictive actions is based on checking the request parameters in the access monitoring session table for the host system for the session ID controlling access to the data range on the volume.

11. The method of claim 1, further comprising in response to receiving a request to query for all sessions, returning the all sessions being monitored by a control unit;
wherein the access monitoring session table comprises the ownership types of single, single with alternates, all joined, and all attached for respective hosts.

12. A system for maintaining data integrity, comprising:
a control unit comprising a processor;
a storage device comprising a plurality of volumes, wherein the control unit is configured to control the storage device, the control unit is operatively connected to the storage device;
the control unit configured to receive a request from a host system to create an access monitoring session for a data range on a volume of the storage device;
the control unit configured to determine a session identification (ID) for the access monitoring session for the data range on the volume;
the control unit configured to create an entry in an access monitoring session table for the session ID, wherein the entry adds the access monitoring session with the session ID for the data range on the volume to the access monitoring session table;
wherein request parameters are included in the request from the host system to create the access monitoring session, the request parameters denote access to the data range on the volume for the session ID and the request parameters are stored in the access monitoring session table; and
the control unit configured to control access to the data range on the volume for the session ID based on the request parameters stored in the access monitoring session table;
wherein the request parameters, included in the request from the host system that is requesting creation of the access monitoring session, comprise an ownership type, ownership types comprising single, single with alternates, all joined, and all attached;

wherein in response to receiving a request to leave the access monitoring session from a host system, the control unit is configured to search for the session ID in the access monitoring session table;

wherein the control unit is configured to fail the request to leave when the session ID is not found in the access monitoring session table;

wherein when the session ID is found in the access monitoring session table, the control unit is configured to remove the access monitoring session from the access monitoring session table: when the host system is a last host system in the access monitoring session and when the host system is a last owner of the access monitoring session;

wherein when the session ID is found in the access monitoring session table, the control unit is configured to reset to default parameters for the host system when the host system is not the last host system in the access monitoring session and when the host system is not the last owner of the access monitoring session; and wherein when the control unit does not permit the last host system to leave the access monitoring session, the control unit is configured to require the last host system to issue a remove request.

13. The system of claim 12, wherein the request parameters transmitted to the control unit from a host system comprise: a function, the session ID, a control unit identification (ID), a notify exit address, a query type, a scope, a type for the host system, a type for other host systems, actions for the host system, actions for all other hosts, the ownership type, an owner, the volume, and the data range.

14. The system of claim 12, wherein in response to receiving a request to join the access monitoring session from a host system, the control unit is configured to determine whether to allow the request to join the access monitoring session based on the entry in the access monitoring session table.

15. The system of claim 12, wherein in response to receiving a request from a host system to become an owner of the access monitoring session with the session ID, the control unit is configured to determine whether to allow the request to become an owner of the access monitoring session based on the ownership type in the entry in the access monitoring session table; and wherein if the session ID is found in the access monitoring session table and if the host system is not the owner of the access monitoring session, the control unit allows the host system to become the owner of the access monitoring session.

16. The system of claim 12, wherein in response to receiving a request to query the access monitoring session with the session ID, the control unit is configured to return a success response with access monitoring session information or a failure response based on whether the session ID is found in the access monitoring session table.

17. The system of claim 12, wherein in response to receiving a request from a host system to remove the access monitoring session with the session ID, the control unit is configured to remove the access monitoring session if the session ID is found in the host system and if the host system is an owner of the access monitoring session.

18. The system of claim 12, wherein the control unit is configured to control actions to the data range on the volume for a plurality of host systems; and wherein controlling actions to the data range on the volume comprise at least one of notify and prevent, based on the entry in the access monitoring session table.

19. The system of claim 12, wherein the control unit is configured to control access to the data range on the volume for the session ID based on a type for host system and a type for other host systems comprising at least one of none, write, and all.

20. The system of claim 12, wherein in response to a failure of an old owner host system of the access monitoring session, the control unit is configured to receive requests to become a new owner host system from a plurality of host systems; and wherein the control unit is configured to mark one of the plurality of host systems as the new owner host system of the access monitoring session in place of the old owner host system based on the new owner host system being a first received request to become the new owner host system.

21. The system of claim 12, wherein the control unit is configured for an owner host system to own the access monitoring session; and wherein in response to the owner host system providing the session ID to other host systems, the control unit is configured to allow the other host systems having the session ID to join as alternate owners of the access monitoring session.

22. The system of claim 12, wherein in response to receiving a request to query for all sessions, the control unit is configured to return the all sessions being monitored by the control unit.

23. A computer program product, tangibly embodied on a non-transitory computer readable medium, the computer program product including instructions for causing a computer to execute a method for maintaining data integrity of a storage device, comprising:

receiving a request from a host system to create an access monitoring session for a data range on a volume of the storage device;

determining a session identification (ID) for the access monitoring session for the data range on the volume;

creating an entry in an access monitoring session table for the session ID, wherein the entry adds the access monitoring session with the session ID for the data range on the volume to the access monitoring session table;

wherein request parameters are included in the request from the host system to create the access monitoring session, the request parameters denote access to the data range on the volume for the session ID and the request parameters are stored in the access monitoring session table;

controlling access to the data range on the volume for the session ID based on the request parameters stored in the access monitoring session table;

wherein the request parameters, included in the request from the host system that is requesting creation of the access monitoring session, comprise an ownership type, ownership types comprising single, single with alternates, all joined, and all attached;

in response to receiving a request to leave the access monitoring session from a host system, searching by a control unit for the session ID in the access monitoring session table;

failing the request to leave when the session ID is not found in the access monitoring session table;

when the session ID is found in the access monitoring session table, removing the access monitoring session from the access monitoring session table: when the host system is a last host system in the access monitoring session and when the host system is a last owner of the access monitoring session;

when the session ID is found in the access monitoring session table, resetting to default parameters for the host system when the host system is not the last host system in the access monitoring session and when the host system is not the last owner of the access monitoring session; and when the control unit does not permit the last host system to leave the access monitoring session, requiring the last host system to issue a remove request.

* * * * *